US010108615B2

(12) United States Patent
Masson et al.

(10) Patent No.: US 10,108,615 B2
(45) Date of Patent: Oct. 23, 2018

(54) COMPARING ENTERED CONTENT OR TEXT TO TRIGGERS, TRIGGERS LINKED TO REPEATED CONTENT BLOCKS FOUND IN A MINIMUM NUMBER OF HISTORIC DOCUMENTS, CONTENT BLOCKS HAVING A MINIMUM SIZE DEFINED BY A USER

(71) Applicant: Microsoft Technology Licensing, LLC., Redmond, WA (US)

(72) Inventors: James Squires Masson, Seattle, WA (US); Shikha Devesh Desai, Bellevue, WA (US); Theresa Ann Estrada, Redmond, WA (US); Michelle Elena Keslin, Kirkland, WA (US); Ruth Kikin-Gil, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 55 days.

(21) Appl. No.: 15/183,460

(22) Filed: Jun. 15, 2016

(65) Prior Publication Data

US 2017/0220567 A1      Aug. 3, 2017

Related U.S. Application Data

(60) Provisional application No. 62/289,503, filed on Feb. 1, 2016.

(51) Int. Cl.
*G06F 17/24* (2006.01)
*G06F 17/30* (2006.01)
(Continued)

(52) U.S. Cl.
CPC ...... *G06F 17/30011* (2013.01); *G06F 17/212* (2013.01); *G06F 17/2229* (2013.01);
(Continued)

(58) Field of Classification Search
CPC ...... G06F 17/212; G06F 17/243; G06F 17/24; G06F 17/30011; G06F 17/3051; G06F 17/30864; G06F 17/2229; G06F 17/276
See application file for complete search history.

(56) References Cited

U.S. PATENT DOCUMENTS 6,216,122 B1 * 4/2001 Elson ................... G06Q 10/107
6,820,075 B2   11/2004 Shanahan et al.
(Continued)

OTHER PUBLICATIONS

"Auto-Complete repetitive words and phrases", Retrieved on: Feb. 8, 2016 Available at: http://www.phraseexpress.com/autocomplete.htm.

(Continued)

*Primary Examiner* — Cesar B Paula
*Assistant Examiner* — Benjamin J Norris
(74) *Attorney, Agent, or Firm* — Merchant & Gould P.C.

(57) ABSTRACT

Automated presentation of repeated content is provided herein. Using historic documents, an index of repeatedly-used content blocks is created. As a user authors a current document, the authoring application is in communication with a trigger analyzer that receives edits and authoring commands from the user. The trigger analyzer compares the edits and authoring commands to the indexed content blocks, and creates previews of potential matches from the index of repeated content that are provided to the user. Depending on user preferences and application settings, these previews are presented to the user as selectable controls in a graphical user interface. If the user selects a preview, the content block associated with the preview is transmitted to the current document for insertion therein. The present disclosure improves the user experience, reduces the use of bandwidth, memory, and processing power to reuse content between documents.

24 Claims, 19 Drawing Sheets

(51) Int. Cl.
    *G06F 17/21*      (2006.01)
    *G06F 17/22*      (2006.01)
    *G06F 17/27*      (2006.01)

(52) U.S. Cl.
    CPC ............ *G06F 17/24* (2013.01); *G06F 17/243* (2013.01); *G06F 17/276* (2013.01); *G06F 17/3051* (2013.01); *G06F 17/30864* (2013.01)

(56) References Cited

U.S. PATENT DOCUMENTS

| | | |
|---|---|---|
| 7,391,529 B2 | 6/2008 | Glaspy et al. |
| 7,480,861 B2 * | 1/2009 | Yalovsky ................ G06F 9/543 715/243 |
| 7,587,385 B2 | 9/2009 | Vayssiere |
| 8,069,411 B2 | 11/2011 | Titemore et al. |
| 8,370,734 B2 | 2/2013 | Boone et al. |
| 8,510,649 B2 | 8/2013 | Isidore |
| 8,645,825 B1 | 2/2014 | Cornea et al. |
| 9,195,736 B2 | 11/2015 | Mohan |
| 2005/0149496 A1 * | 7/2005 | Mukherjee ........ G06F 17/30528 |
| 2005/0171965 A1 | 8/2005 | Fujimoto et al. |
| 2008/0126983 A1 | 5/2008 | Keohane et al. |
| 2011/0004610 A1 * | 1/2011 | Rose ..................... G06F 17/277 707/759 |
| 2012/0290926 A1 * | 11/2012 | Kapadia ................. G06F 17/24 715/255 |
| 2012/0324350 A1 | 12/2012 | Rosenblum et al. |
| 2013/0290410 A1 | 10/2013 | Zhang |
| 2014/0114962 A1 * | 4/2014 | Rosenburg ........... G06Q 10/063 707/723 |
| 2014/0164890 A1 | 6/2014 | Fox et al. |
| 2014/0244622 A1 | 8/2014 | Lindsay et al. |

OTHER PUBLICATIONS

"International Search Report and Written Opinion Issued in PCT Application No. PCT/US2017/015535", dated May 11, 2017, 12 Pages.

* cited by examiner

FIG. 3C

Recipes - Word

FILE | HOME | INSERT | DESIGN | PAGE LAYOUT | REFERENCES | MAILINGS | REVIEW | VIEW

220

Granny's Brownie Recipe — 210

Ingredients
½ C sugar, ¼ C cocoa, 2 C all purpose flour, 1 Tbs Baking soda, 3 eggs, 1/3 C butter melted, 1 C water, 2 C powdered sugar, ¼ C walnuts (optional)

Preheat the oven to 350 degrees and lightly butter a 9x9 glass baking dish, making sure to butter the corners well.

Separate the yolks and whites by cracking the shells over a bowl and passing the yolk between the two halves of the shell and letting the white fall into the bowl

230 then beat the whites to form stiff peaks.

320

Separate the yolks and whites

Beat — 260a
1 — then beat the whites to form stiff peaks.

Cracking — 260b
2 — by cracking the shells over a bowl and passing the yolk [...]

Image — 260c
3

More? — 330

310

PAGE 1 OF 1 — ENGLISH (UNITED STATES)

300c

+100%

COMPARING ENTERED CONTENT OR TEXT TO TRIGGERS, TRIGGERS LINKED TO REPEATED CONTENT BLOCKS FOUND IN A MINIMUM NUMBER OF HISTORIC DOCUMENTS, CONTENT BLOCKS HAVING A MINIMUM SIZE DEFINED BY A USER

CROSS-REFERENCE TO RELATED APPLICATIONS

This application claims benefit of U.S. Provisional Application No. 62/289,503 titled "AUTOMATED REPEATED CONTENT PRESENTATION" filed on Feb. 1, 2016, the entirety of which is hereby incorporated by reference.

BACKGROUND

Users of electronic document authoring applications, such as word processor applications, spreadsheet applications, slide presentation applications, email applications, note-taking applications, and the like, often find themselves using the same content across multiple electronic documents. Many users, to reuse blocks of content across documents, will open an older document, select the desired content block, copy it, and paste that content block into a current document. This process requires the user to open multiple documents and for the associated processing resources to be expended to open and maintain multiple electronic documents in active memory. Additionally, this process requires the user to know which document contains the desired content block (or to open multiple documents to search for the desired content block), and does not take into account version control; the user may select an older version of a content block (e.g., from an older document) that may have been superseded (e.g., in a newer document in which the user did not search). Moreover, if content is transferred between different applications (e.g., from a spreadsheet application to a word processor application), additional processing resources may need to be expended to effect the transfer of content.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

The automated presentation of repeated content is provided herein. Using the historic documents of the user, or colleagues of a user in an organizational setting, an index of repeatedly-used content blocks is created. In various aspects, the index references locations within the historic documents in which content blocks reside, while in other aspects, the index stores the repeated content blocks. Content blocks include, but are not limited to, sentences, paragraphs, pages, slides, images, charts, graphs, tables, videos, and audio files.

As the user authors a current document in an application, the application is in communication with a trigger analyzer. In various aspects, a trigger analyzer is part of a cloud storage solution that receives edits and authoring commands from the user for storage as part of a cloud-stored electronic document. The trigger analyzer compares the edits and authoring commands to the indexed content blocks, and creates previews of potential matches from the index of repeated content that are provided to the user. Depending on user preferences and application settings, these previews are presented to the user as selectable controls in a graphical user interface. If the user selects a preview, the content block associated with the preview is transmitted to the current document for insertion into the document.

The present disclosure thus reduces the amount of communications to a storage device (remote or local) to find content blocks that a user wishes to reuse in a current document from an older document, the processing resources needed to reuse content blocks, and improves the user experience of inserting repeated content from the manual hunt-copy-paste process.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIGS. 3A-C are example user interfaces of paned presentations;

DETAILED DESCRIPTION

Figure 1:
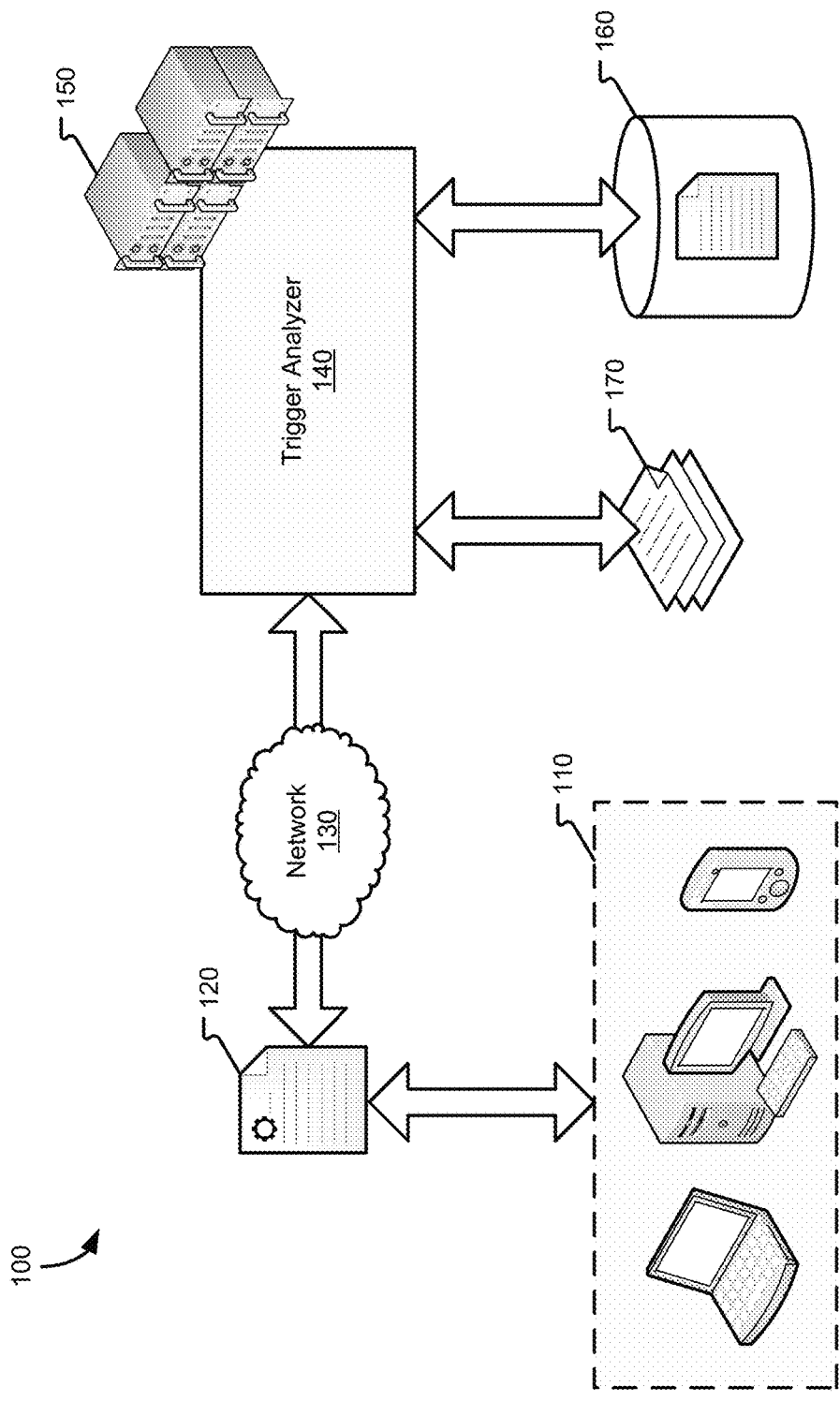
FIG. 1 is a block diagram illustrating an authoring environment in which automated repeated content presentation may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

FIG. 1 is a block diagram illustrating an authoring environment 100 in which automated repeated content presentation may be practiced. As illustrated, a user device 110 is used to author a current document 120. The changes and edits to the current document 120 are communicated to a trigger analyzer 140 over a network 130. In various aspects, the trigger analyzer 140 is a computer program running on a server 150, and is optimized to provide previously entered content blocks to the user when authoring the document. The server 150 is in communication with a database 160 that stores historic documents associated with the user from which the trigger analyzer 140 will build an index 170 of content blocks from which repeated content is selected to present to the user.

The user device 110, server 150, and database 160 are illustrative of a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers. The hardware of these computing systems is discussed in greater detail in regard to FIGS. 7, 8A, and 8B. As will be appreciated, the server 150 and the database 160 may be part of a distributed system, and composed of a multitude of individual computing systems, and multiple user devices 110 may be in communication with the trigger analyzer 140 for the presentation of repeated content blocks when authoring the current document 120.

In various aspects, the database 160 is remotely located from the user device 110, while in other aspects, the database 160 also includes storage devices local to the user device 110. For example, when the current document 120 is authored in a cloud computing environment, such as, via a web interface or thin client, the trigger analyzer 140 will build the index 170 of content blocks from historic documents located in the cloud (e.g., stored in a database 160 or memory storage device managed by the server 150), historic documents located locally to the user (e.g., stored in a database 160 or memory storage device managed by the user device 110), and historic documents located on devices part of a local or enterprise network in communication with the user device 110 (e.g., stored in a database 160 or memory storage device managed by a different user device 110 or a local or enterprise server, such as a document management system).

The user or the trigger analyzer 140 may designate databases 160 or portions of databases 160 from which historic documents may be drawn, and may also designate specific historic documents. For example, a user may designate an associated ONEDRIVE®, DROPBOX®, ICLOUD®, or GOOGLE DRIVE™ cloud storage solution (available from MICROSOFT CORP. of Redmond, Wash., DROPBOX INC., of San Francisco, Calif., APPLE INC., of Cupertino, Calif., and ALPHABET INC., of Mountain View, Calif., respectively) as the database 160. The user may also designate a hard drive, folder, or file local to the user device 110 or connected to the network 130 as the database 160. The trigger analyzer 140 may also designate cloud or local storage associated with the user or a colleague of the user as the database 160. For example, the trigger analyzer 140 may locate files, folders, and drives of colleagues of the user via the DELVE™ or DOCURATED™ management tools (available from MICROSOFT CORP. of Redmond, Wash. and DOCURATED LLC of New York, N.Y.), to discover connections between persons in an organization so as to automatically share historic documents (or to prompt the user to accept the sharing thereof) that may contain content blocks that the user may want to reuse in the current document 120.

For example, in the context of an editorial organization (e.g., a magazine, newspaper, book publisher), the user may designate a style sheet file, having specific phrases, bylines, and introductions as a database 160, and exclude draft files from the database 160. In another example, in the context of a physical therapist's office, the therapists may designate each other (or be designated by the trigger analyzer 140) as colleagues, so that their exercise instructions, stored in a document management system, may be repeatedly used in each other's instructions to patients. In yet another example, a home user may designate a local "My Documents" folder, an email account, and a cloud storage solution as the database 160 so that repeated content blocks in personal documents (e.g., personal letters, homework assignments) are available for automated presentation when authoring a current document 120. In still another example, a teacher may set folders holding previous homework assignments and tests as the database 160, to draw old questions containing form-fields as repeated content, wherein the data in the form-fields may vary between historic documents while the blocks of content that include the form-fields are still considered repeated content.

The server 150 may be located remotely from the local network of the user device 110, for example, as a cloud server, in which case the network 130 represents the Internet or a Virtual Private Network (VPN) or other direct data link. The server 150 may also be located as part of the local network of the user device 110, in which case the network 130 represents a Local Area Network (LAN) or private distributed network for an entity (e.g., a company, a university, a government agency). The trigger analyzer 140 is provided by the server 150 to authorized users and receives communications over the network 130 to build the index 170 and provide content blocks to the current documents 120 of those authorized users.

The current document 120 is an electronic document that is being authored or edited by a user of the user device 110. Electronic documents include files accessible by applications used for word processing, spreadsheet management, slide presentation construction, email composition, and note taking. The current document 120 may be stored locally on the user device 110, stored in a database 160 that is part of a local or enterprise network (e.g., a document management system, a shared drive, a remote computer accessed via remote desktop access), or stored in the cloud. Historic documents are those documents which the user, or a colleague of the user, has already authored. As will be appreciated, historic documents may be stored in an unfinished state (e.g., further work needs to be done to the document) and may be opened as current documents 120. In various aspects, a saved version of a current document 120 may be treated as a historic document for another user (e.g., a colleague), but any unsaved or unfinalized changes to the document will be unavailable to the trigger analyzer 140 to present as a block of repeated content.

The trigger analyzer 140 identifies blocks of content from historic documents that appear in multiple historic documents. The trigger analyzer 140 may include a threshold for a minimum number of historic documents that repeat a block of content to consider a content block to be "repeated" for purposes of automatic presentation to a user. For example, a block of content must be found in 2, 3, 87, etc., historic documents before it is considered to be a repeated block worth presenting to a user when authoring the current document 120.

Minimum sizes for a block of content are set and adjusted via preferences in the trigger analyzer 140. For example, although the individual word "the" may appear in thousands of historic documents, a threshold of eight words would prevent "the" as being classified as a block of content. In a contrary example, if the phrase "the quick brown fox jumps over the lazy dog" (having nine words, delineated by spaces) were to appear in multiple historic documents and a threshold were set at eight, it would be treated as a content block that had been repeated in historic documents, and may be repeated in a future document. The trigger analyzer 140 would therefore include the content block in the index 170 (either as a reference to the associated portion of the historic document or as the content itself) and would associate a trigger with that content block. For example, the words "the quick brown" may be set as a trigger, or the words preceding the content block in the text of the historic documents may be set as triggers.

Similarly, maximum sizes for a block of content may also be set and adjusted via preferences in the trigger analyzer 140. For example, if multiple word processing files included several pages of identical text, a maximum threshold of a paragraph or a page would break the identical text into paragraph-delineated or page-delineated content blocks respectively, each with its own trigger (or using the previous content block as its trigger). Similarly, if multiple note taking files included several canvases of identical data (e.g., text, images, and tables), a maximum threshold of 500 kilobytes (kb) would prevent a content block of more than 500 kb from being provided at one time to a user authoring the current document 120. In various aspects that use a clipboard to insert blocks of content, a clipboard function of an operating system or authoring application may set a maximum size of a block of content.

As will be appreciated, content blocks may include textual data as well as non-textual data, such as, for example, graphs, tables, images, videos, sound files, etc., and triggers include textual data and non-textual data. Textual data include plaintext, hypertext (e.g., linked text), and text form-fields. Content blocks may include multiple types of data, and content blocks including non-textual data may have different size requirements (or no size requirement) and triggers than purely textual content blocks. For example, an image content block (e.g., an image file or series of image files) may have no minimum size, a maximum size of 50 kb and use the text string of "the quick brown fox jumps over the lazy dog" as its trigger. In another example, the textual content block of "the quick brown fox jumps over the lazy dog" may use the insertion of an image content block (e.g., an image file) of a fox jumping over a dog as its trigger. In yet another example, a mixed-media content block of the above-mentioned text and image may use the initial text of "the quick brown" as its trigger.

Similar to content blocks, triggers may have minimum and maximum size requirements. For example, a three word phrase may be the exact requirement (minimum and maximum) of a trigger. In another example, a single word of at least seven characters may be a minimum requirement and five words or eighty characters may be the maximum requirements. For textual triggers, a case sensitivity may be enabled or disabled, and punctuation (e.g., commas, hyphens, semicolons, quotation marks) may also be included or excluded when comparing content to the triggers. One of ordinary skill in the art will appreciate from the present disclosure the relative benefits and tradeoffs of larger and smaller size requirements for a trigger.

In various aspects, the index 170 may include repeated content blocks or references to locations within historic documents from which the repeated blocks of content may be retrieved. The index 170 may be stored on the database 160 or a memory storage device local to the trigger analyzer 140, a server 150 providing cloud-enabled document authoring, or the user device 110. In some aspects, a reduced-size index 170 may be stored locally to the user, so that if the user loses access to the network 130, automated presentation of repeated content blocks may continue to be provided to the user.

In various aspects, the trigger analyzer 140 receives authoring commands to the current document 120 (e.g., typing, inserting, replacing (including autocorrect), deleting, undoing, and redoing) as they are made, and stores those commands in a register for determining whether a trigger has been received. The size of the register will be determined according to the size requirements for a trigger. For example, as the user types "the quick brown fox jumps over the lazy dog," the characters that comprise each of the components words are fed into a register maintained on the server 150 by the trigger analyzer 140. As the register fills, old content is removed from the register, for example, by bit-shifting blocks of data in the register as new data arrive. The register allows the trigger analyzer 140 to find triggers in near real-time as the user types or enters content, and incomplete words may be used when searching for potential triggers. For example, if the user has already typed or entered "the quick" and is typing "brown", the trigger analyzer 140 is operable to match what the user has entered to the trigger "the quick brown" as the user is typing the last word of the trigger.

As will be appreciated, the order of the data in the register may be used to add additional exactness to searches for relevant triggers, but non-sequential data entry, deletion of data, and undo/redo commands must be treated specially by the trigger analyzer 140 when using a register. For example, if a user types "the quick brown" sequentially, the order of the words in the register can be used to help match or rank a trigger for presentation to the user. If, however, the user types "the brown", and later inserts "quick" between them, the order of the words in the register may not match that in the current document 120. Therefore, the register may be oversized from the requirements of a trigger so that additional data may be held and rearranged in the register for real-time analysis as the user enters content into the current document.

In other aspects, the trigger analyzer 140 analyzes committed changes to the current document 120 in reverse from a current position of a user (e.g., as indicated by a cursor in a Graphical User Interface (GUI)) in the current document 120. The length back in the current document 120 that the trigger analyzer 140 analyzes is determined by the size requirements for a trigger. For example, when a user repositions a cursor (or the cursor is automatically repositioned as content is added to a document) the last n words in the current document 120 based on the cursor position will be examined by the trigger analyzer 140 for matching triggers from the index 170.

In yet other aspects, the trigger analyzer 140 analyzes content sent to it via a query. For example, a user may enter a text string or paste non-textual content into a data field and transmit the contents of the data field to the trigger analyzer 140.

Both of the above-described aspects of the trigger analyzer 140 may be provided concurrently, only one of the above-described aspects may be provided, or none of the above-described aspects may be provided as user preferences, and network 130, user device 110, and server 150 conditions dictate. For example, a user may enable or disable the register and/or committed changes aspect via preferences. The user device 110 may automatically disable one or more of the aspects (enabled by the user) if the available bandwidth of the network 130, processing resources or memory of the user device 110, or response time of the application used to author the current document 120 drop below set thresholds. Similarly, the server 150 may disable one of more aspects (enabled by the user) if the available bandwidth of the network 130, processing resources or memory of the server 150, or response time of the trigger analyzer 140 or application used to author the current document 120 drop below set thresholds.

When the trigger analyzer 140 determines that a trigger for a block of repeated content exists in the current document 120, associated content blocks are retrieved according to the index 170. As will be appreciated, multiple content blocks may share the same trigger, and the multiple potential triggers may be present in the register or the contents of the current document 120 that the trigger analyzer 140 analyzes. Therefore the trigger analyzer 140 is operable to rank any content blocks that it returns as potential matches from the index 170. For example, if the register contains the five words "quick brown fox jumps over," and known triggers include "the quick brown," and "jumps quick over," all of the repeated content blocks may be returned from the index 170 to the trigger analyzer 140, which will rank the results (if more than one is returned) and transmit a notification that a block of repeated content is available for inclusion in the current document.

In various aspects, the trigger analyzer 140 ranks the resulting content blocks from the index 170 by: an exactness of a content block's trigger to the contents of the register, the analyzed portion of the current document 120, or the contents of the query; a recentness of use of the content blocks (e.g., most recent, most recent not appearing in the current document 120, least recent, most recently becoming considered a repeated content block); a frequency of use of content blocks (e.g., most frequent, most frequent not appearing in the current document 120, least frequent); a user preference; and combinations thereof.

A notification that repeated content is available for inclusion in the current document is then transmitted over the network 130 from the trigger analyzer 140 to the user device 110. In various aspects, such as is illustrated in regard to FIGS. 2A-F and 4A-C, an inline notification is provided to the user within the content of the current document. In other aspects, such as is illustrated in regard to FIGS. 3A-C, a window or panel that is part of the application used for authoring the current document 120 provides the notification. The notification may be a control to insert the highest ranked repeated content block, as determined by the trigger analyzer 140, or may provide previews of the content blocks for the user to select from.

FIGS. 2A-F, 3A-C, and 4A-C illustrate various user interfaces (UI) and elements thereof in the context of authoring a current document 120 that has a recipe for making brownies as its content, as an example for demonstrating the user experience while authoring the document. The user authoring the current document 120 has access to several previously authored recipes that are used as historic documents, which may contain blocks of repeated content due to the similarities between recipes. The trigger analyzer 140 will enable the user to reuse repeated content from those historic documents without having to hunt for a file with the desired content, open the file, find the desired content block, copy the desired content block, and paste it in the current document 120. Instead, the trigger analyzer 140 will, depending on the context of use specific to each of the FIGS. 2A-F, 3A-C, and 4A-C, find potential content blocks to reuse based on the state of the current document 120.

Several common features to each of the FIGS. 2A-F, 3A-C, and 4A-C include the document display 210 (which includes pages, canvases, slides, and the like in which the content of the current document 120 is displayed via an application), the menu bar 220 (which may include a ribbon interface, a dropdown menu interface, or a collapsible interface) for the application used to author the current document 120, and a text cursor 230 (when text in the current document 120 is selected). One of ordinary skill in the art will appreciate that the arrangement, shape, color, size, and iconography of UI elements may differ in various aspects, that combinations of the discussed aspects are possible, and the examples discussed herein are provided for illustrative purposes, and that the present disclosure is not limited to the aspects illustrated and discussed herein, but that the proper scope of the present disclosure is to be determined from the claims.

FIGS. 2A-F are examples of UI for inline presentations 200a-f. Each of the inline presentations 200a-f (generally, inline presentations 200) illustrate, in sequence, the UI as the user authors the current document 120 and is automatically presented with, and chooses to use, content blocks of repeated content. In the FIGS. 2A-F, the user is using a desktop implementation of a word processing application, although other applications may also make use of the present disclosure, such as, for example, spreadsheet applications, slide presentation application, email applications, note-taking applications, and the like.

Figure 2A:
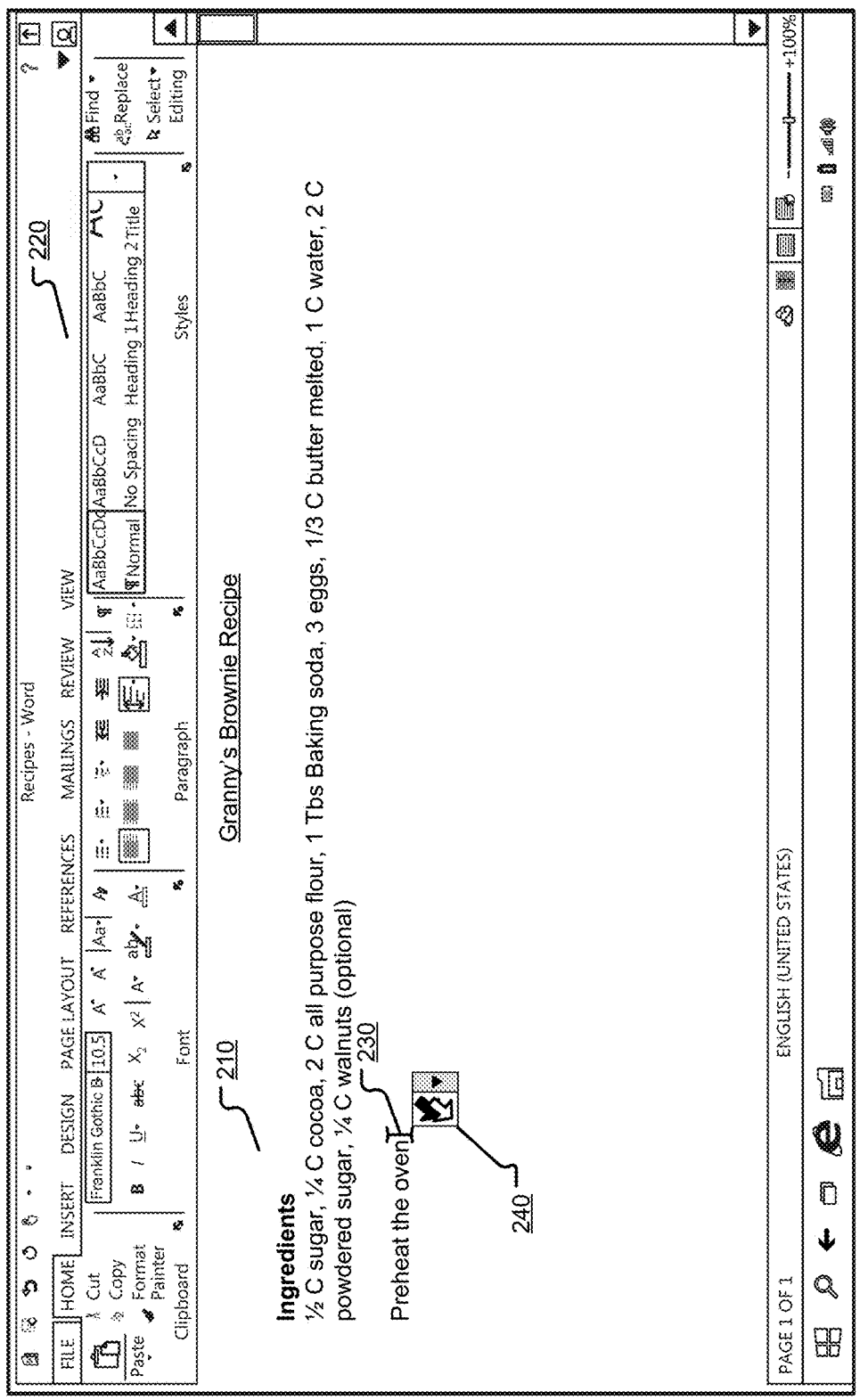
FIGS. 2A-F are example user interfaces of inline presentations.

In FIG. 2A, an initial inline presentation 200a is illustrated. The user has begun authoring a document related to a recipe, and the trigger analyzer 140 has recognized the phrase "Preheat the oven" as a trigger. The trigger analyzer 140 has notified the application that a block of repeated content exists that matches the trigger, which is indicated to the user in the GUI via a notification icon 240. In the inline presentations 200, the notification icon is displayed inline; it is displayed as an overlay of the document display 210 proximate to the text cursor 230 that the user may interact with to enter a block of repeated content into the current document 120. Depending on the position of the text cursor 230 within the document display 210 relative to the screen displaying the current document 120 (e.g., at the top of the screen, at the bottom of the screen, on a left or right edge of the screen, in the middle of the screen) the location of the notification icon 240 may vary so that it is displayed within the document display 210 (e.g., above, below, to the right of, and/or to the left of the text cursor 230).

Figure 2B:
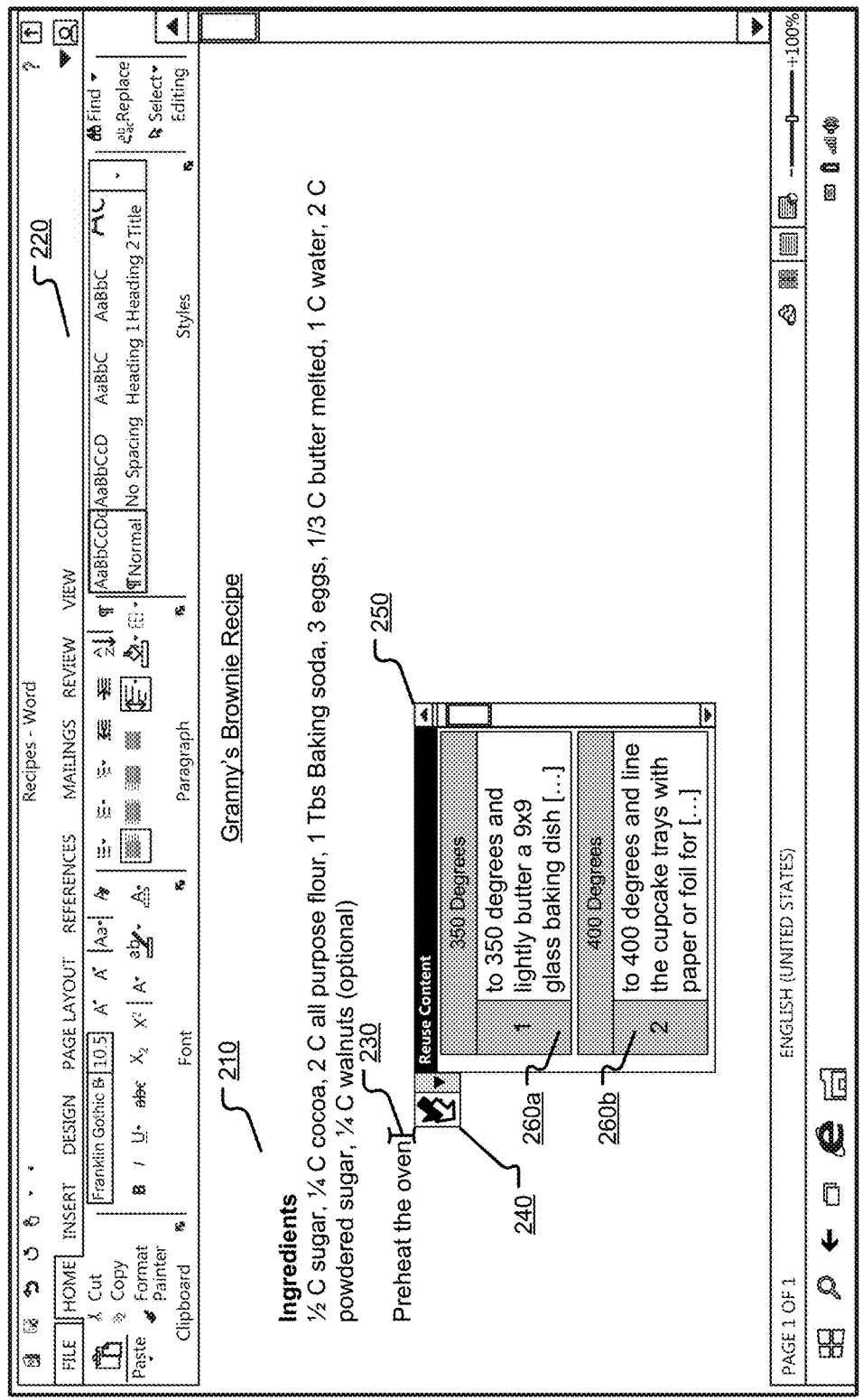
Figure 2C:
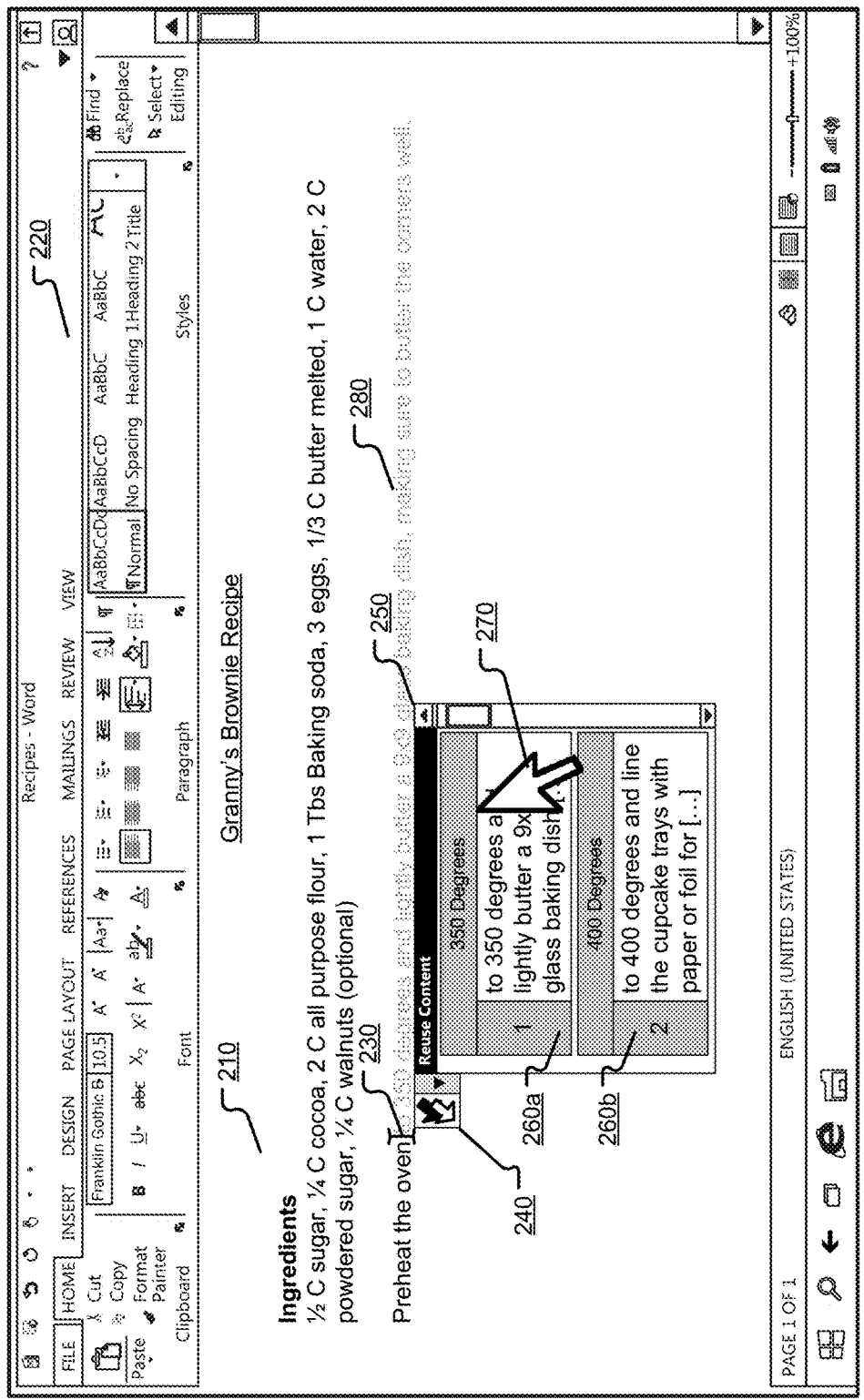

In FIG. 2B, a second inline presentation 200b is illustrated, which proceeds from the initial inline presentation 200a. In the second inline presentation 200b, the user has selected an actuable subcontrol of the notification icon 240 (represented in FIGS. 2A-F with a gray box with a downward arrow) to present a contextual menu 250 that includes first preview control 260a and second preview control 260b (generally, preview controls 260). The contextual menu 250, similar to the notification icon 240, overlays the document display 210 and may vary in its position within the document display 210 relative to the screen displaying the current document 120. In various aspects, the arrow present in a subcontrol of the notification icon 240 will vary in which direction it points to indicate a general direction relative to the notification icon 240 that the contextual menu 250 will be displayed.

Within the contextual menu 250, multiple preview controls 260 are displayed. The preview controls 260 are generated and ordered (i.e., ranked for presentation) by the trigger analyzer 140 from the repeated content blocks, and display at least a portion of the content block to the user. When the repeated content includes text, some of all of the text may be displayed, with an associated style (e.g., typeface, size, boldface, italics, strikethrough) from the historic document from which it is drawn. When the repeated content includes non-textual data, thumbnails, reduced quality versions (e.g., with lower bits per second (BPS) rates, higher compression, reduced size (cropped or resized)) may be generated for preview. Depending on the size of the contextual menu 250 and the size of the preview controls 260, the amount of the content blocks previewed may be changed, and controls to view additional preview controls 260 (e.g., a scroll bar, navigation buttons) may be provided within the contextual menu 250. In various aspects, the trigger analyzer 140 uses user preferences to generate up to a set number of previews (e.g., up to three, four, five, etc.), and if the user desires more previews, and more potential content blocks are known to the trigger analyzer 140, additional previews will be generated and displayed as preview controls 260 in the contextual menu 250.

The content blocks shown as previews in the preview controls 260 are selected by the trigger analyzer 140 and are chosen based on triggers in the current document 120, such as, for example, the last n content items (e.g., words, letters, images, paragraphs) entered by the user or the last n content items extending backwards from the text cursor 230 (where backwards is leftward in a right-to-left writing system, rightward in a left-to-right writing system, and upward in a top-to-bottom writing system). The textual content blocks that are selected are compared with the index 170 for triggers and repeated content blocks that are present in historic documents that are related to the content of the current document 120. The repeated content blocks are used to generate a preview, which is transmitted to the user device 110 for the user to select from and signal the trigger analyzer 140 to transmit the associated content block to the current document 120 (on the user device 110, the server 150, or the cloud, depending on where the current document 120 is hosted). In the examples shown in FIG. 2B, based on a trigger of "Preheat the oven", the trigger analyzer 140 returned repeated content blocks (for example from previous recipes in the database 160) of text for preheating an oven to a set temperature and preparing a baking vessel taken from the historic documents of other recipes. The entire content block, if short enough for display in a preview control 260 may be provided to the user to select, or if the content block exceeds the display properties of the preview control 260 (i.e., is too large), the size of the preview control 260 may be adjusted, or the trigger analyzer 140 will generate a preview based on the content block that will fit the display properties of the preview control 260.

The preview controls 260 are presented as controls within the contextual menu 250 that the user may select to insert the associated content block. A user may select the preview control 260 (e.g., via a mouse click, a mouse over, a scroll wheel, a keyboard selection (e.g., by using a "1" key to select a first preview control 260a, a "2" key to select a second preview control 260b, tabbing to the desired control), a touchscreen depression or contact) to have an action performed relative to the content block associated with the preview control 260. For example, as illustrated in third inline presentation 200c in FIG. 2C, when a mouse cursor 270 mouses over a preview control 260, a ghosted preview 280 will be shown in the document display 210, where the content block will be inserted. The ghosted preview 280 shows the content that is selected in in the document display 210 in a style indicating that is has not been committed to the document (e.g., "grayed out", with an ants-marching effect, with pulsing effect to fade in and out of display, with a user defined style), and may temporarily shift existing content in the document display 210 if its insertion would shift the existing content.

Figure 2D:
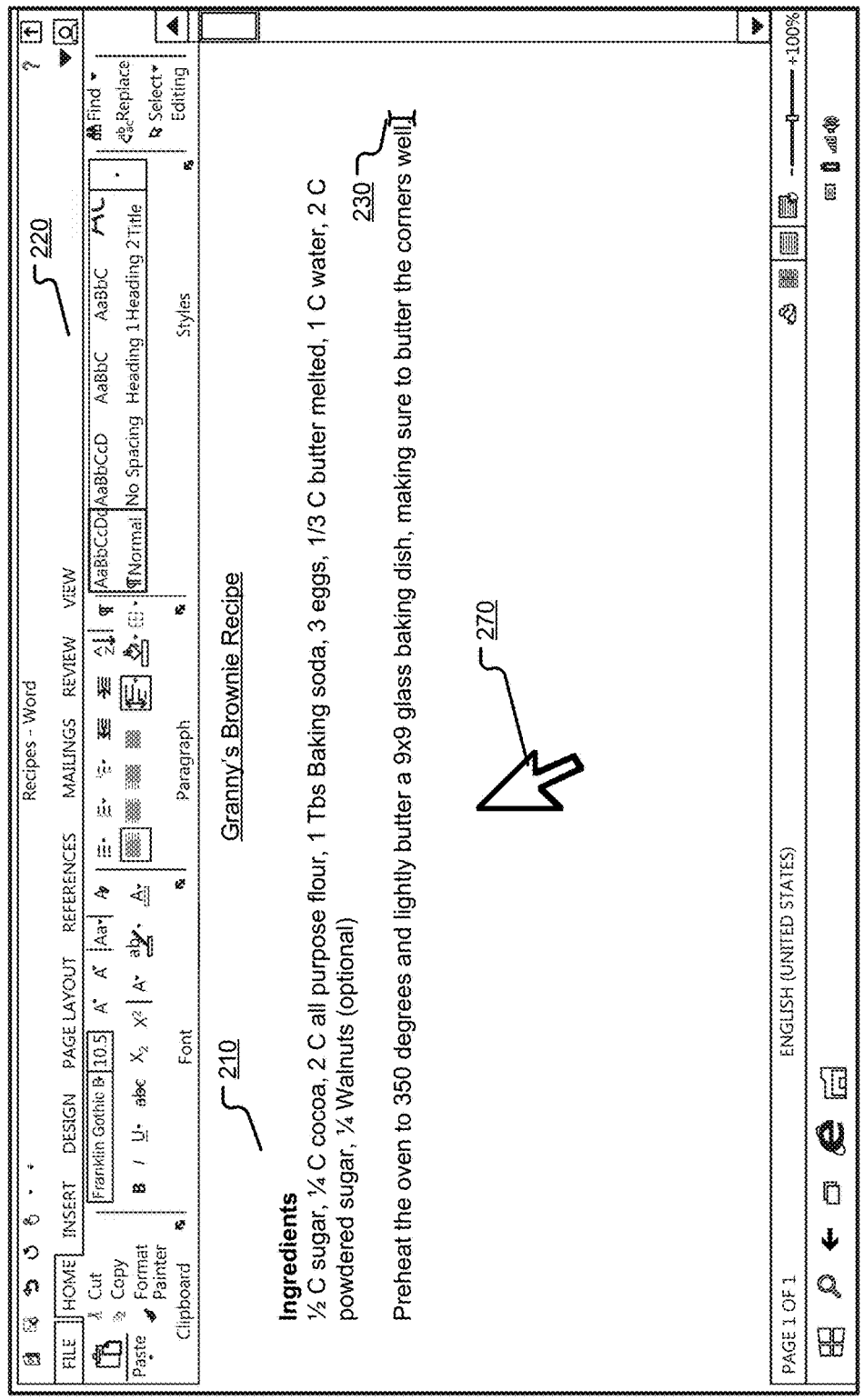

In another example, as illustrated in fourth inline presentation 200d in FIG. 2D, when the user left clicks on a preview control 260, the associated content block will be inserted into the current document 120, the notification icon 240 and contextual menu 250 (and any included preview controls 260) will be removed from the document display 210, and the text cursor 230 will be moved to the end of the inserted content block so that the user may continue entering text from the end of the content block. In some aspects, a user may also actuate the main section of the notification icon 240 (i.e., the portion illustrated with a double arrow) to insert the first ranked content block (i.e., the content block associated with the first preview control 260a) without having the contextual menu presented. As will be appreciated, the example controls and actions given above may be remapped to different actions, key bindings, short-cuts, and the like.

In various aspects, the user preferences may set that the content block is to be inserted with the formatting from the historical documents in which it is repeated (if the historic documents share the same formatting), or to use the formatting of the current document 120 at the point of the text cursor 230.

When using undo commands after performing an insertion of a repeated content block, in various aspects, the notification icon 240 may be re-presented or not re-presented, and the contextual menu, in various aspects, will be open or not opened, depending on whether it was opened when the repeated content block was inserted before the undo command. When using a redo command (to undo an undo command), the notification icon 240 and contextual menu 250 will not be displayed at the completion of the redo command, similar to how those UI elements are removed when the content block is originally inserted.

Figure 2E:
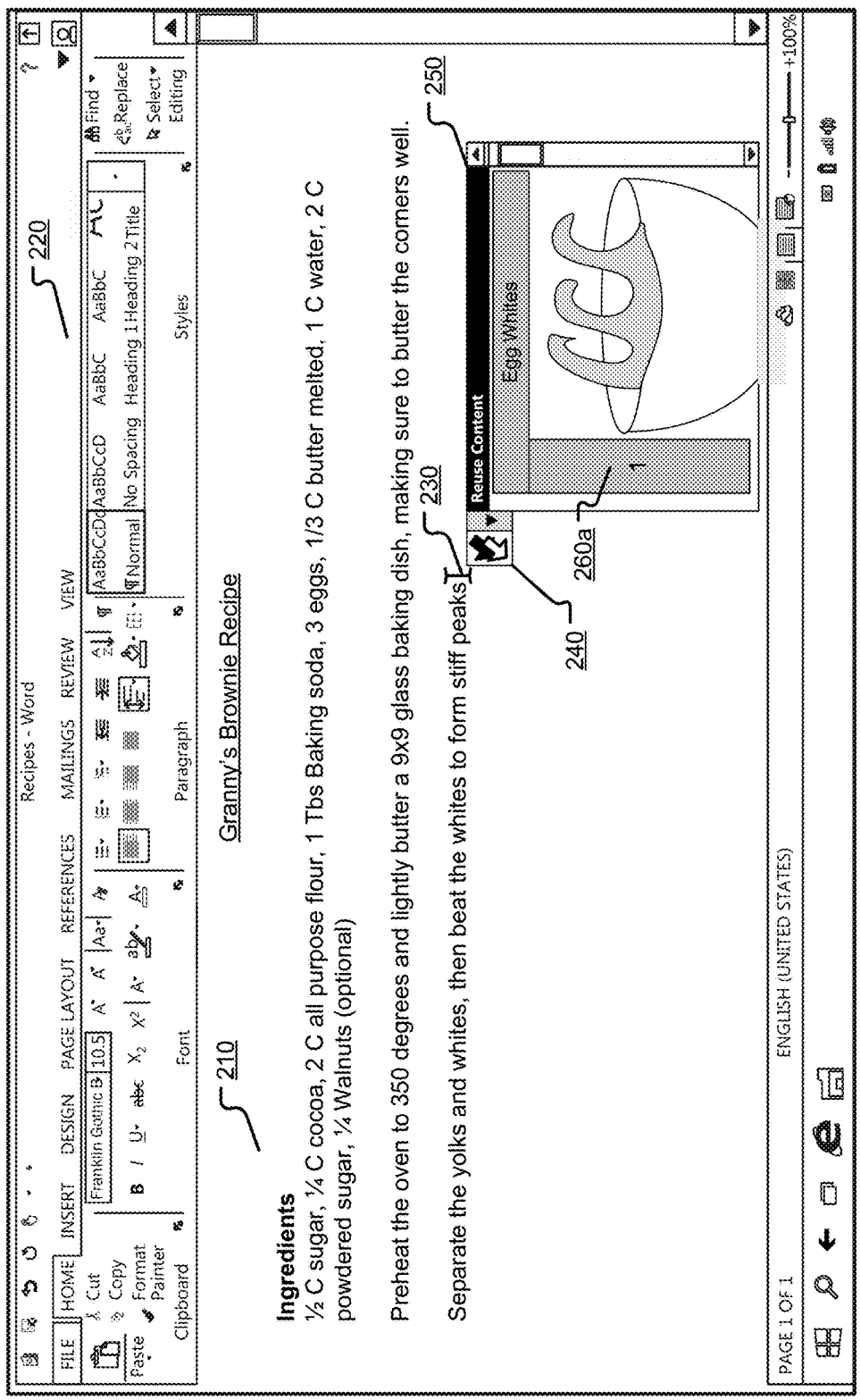

In FIG. 2E, a fifth inline presentation 200e is illustrated, which proceeds from the fourth inline presentation 200d. In the fifth inline presentation 200e, the user has selected an actuable subcontrol of the notification icon 240 that presents a contextual menu 250 that include a preview control 260 for repeated content of non-textual data. The non-textual data include images, charts, graphs, sound files, videos, etc., that have been repeatedly used in the historic documents. Similar to the insertion of textual content blocks as discussed in FIGS. 2A-D, non-textual content blocks may be selected for insertion into the current document 120 by the user via the notification icon 240 directly, or via a preview control 260 accessed via the contextual menu 250. If the non-textual content in the preview controls 260 include video or audio elements (e.g., an animated image file, a video file, an audio file), those elements may be previewed via the preview controls 260 as reduced quality, reduced length, or reduced quality and length versions of the original content blocks.

In the illustrated example of FIG. 2E, the document display 210 includes a preview control 260 for a non-textual content of an image of what stiff peaks of egg whites look like or a video of how to form stiff peaks in egg whites. The trigger analyzer 140 uses the content of the current document 120 or the section thereof (paragraph, line, sentence, clause, last n words) in which the text cursor 230 resides (reciting, in part, "then beat the whites to form stiff peaks") to compare with the index for triggers and repeated content blocks that are present in historic documents that are related to the content of the current document 120. The repeated content blocks are used to generate a preview, which is transmitted to the user device 110 for the user to select from and signal the trigger analyzer 140 to transmit the associated content block to the current document 120 (on the user device 110, the server 150, or the cloud, depending on where the current document 120 is hosted).

Figure 2F:
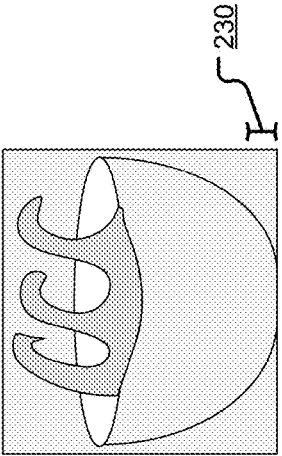

On selection of the non-textual content, and as illustrated in FIG. 2F for inline presentation 200f, the repeated block of non-textual content is inserted into the current document 120, and notification icons 240 are removed from the document display 210, and the position of the text cursor 230 in the document display 210 is adjusted accordingly. In various aspects, the user preferences may set that the content block is to be inserted with the formatting from the historical documents in which it is repeated (if the historic documents share the same formatting), or to use the formatting of the current document 120 at the point of the text cursor 230.

Figure 3A:
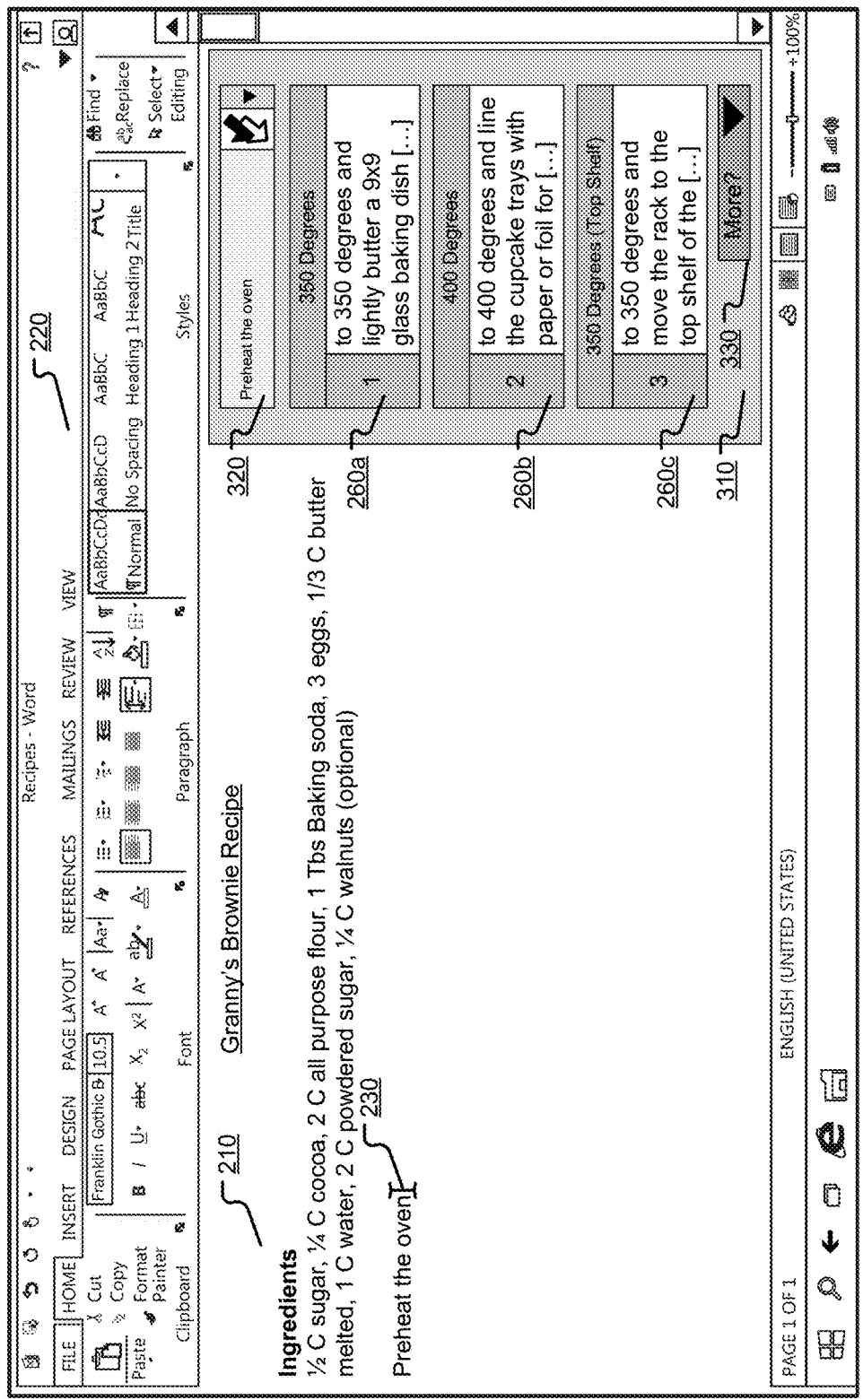
Figure 3B:
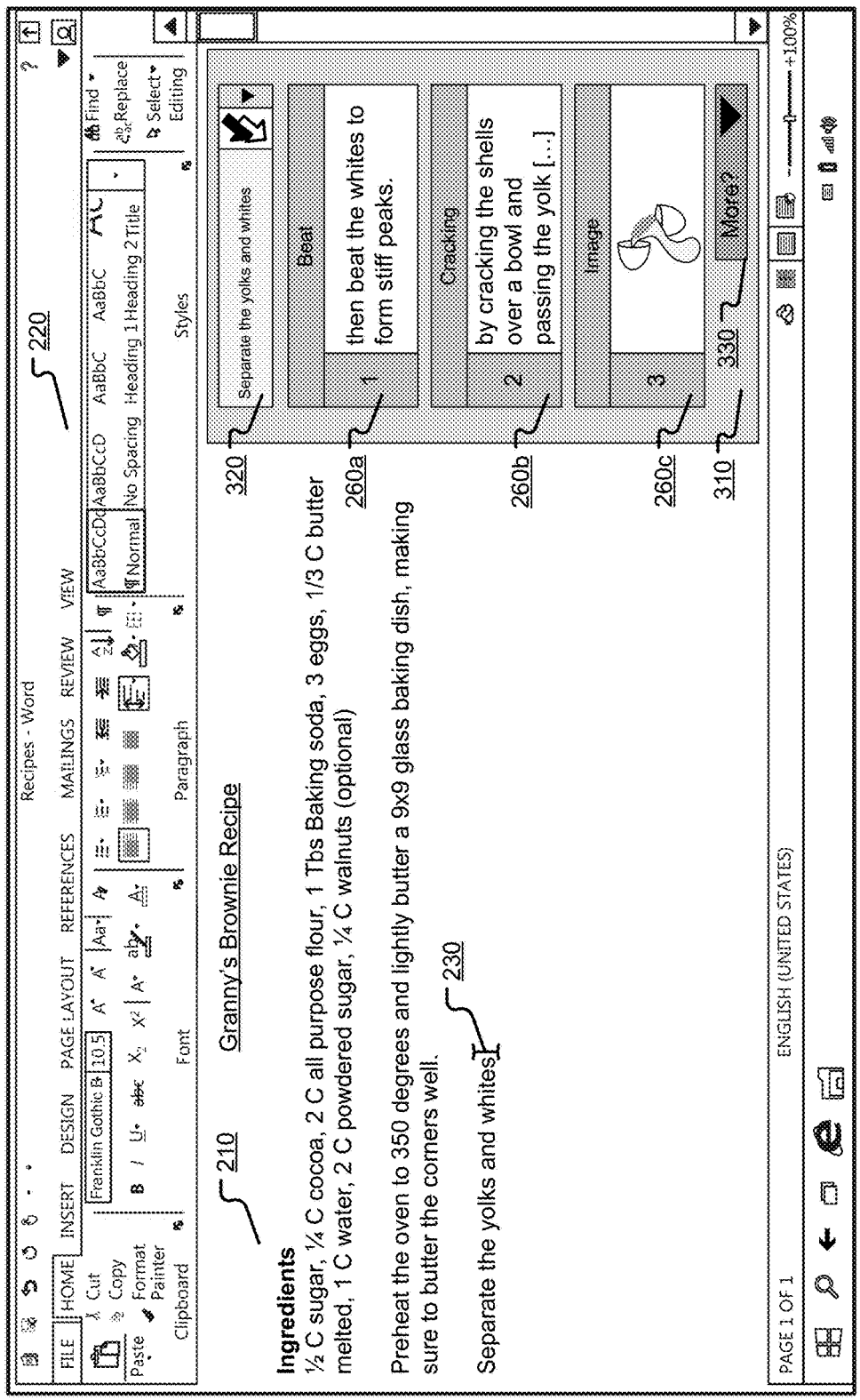

FIGS. 3A-C are examples of UI for paned presentations 300a-c. Each of the paned presentations 300a-c (generally, paned presentations 300) illustrate, in sequence, the UI as the user authors the current document 120 and is automatically presented with, and chooses to use, content blocks of repeated content. In the FIGS. 3A-C, the user is using a desktop implementation of a word processing application, although other applications may also make use of the present disclosure, such as, for example, spreadsheet applications, slide presentation application, email applications, note-taking applications, and the like.

In FIG. 3A, an initial paned presentation 300a is illustrated. The user has begun authoring a document related to a recipe, and the trigger analyzer 140 has recognized the phrase "Preheat the oven" as a trigger. Unlike an inline presentation 200, where the authoring commands received by the trigger analyzer 140 include adding (or deleting) content to the current document 120 or positioning a text cursor 230 and analyzing the content extending backward from the newly positioned text cursor 230, in a paned presentation 300 the authoring commands include entering a potential trigger into a search box 320 in a pane 310.

In various aspects, the pane 310 may be a docked window or panel outside of the document display 210 within the application display, a modal undocked window that overlays the document display 210 (or is displayed outside of the application window when the application is operating on less than the total screen area available to the user device 110), or a non-modal undocked window that overlays the document display 210 (or is displayed outside of the application window when the application is operating on less than the total screen area available to the user device 110).

In various aspects the search box 320 is populated manually by the user or automatically by the application. For example, the search box 320 may be automatically populated with the last n words backward from the text cursor 230, highlighted text, or be blank when the pane 310 is opened. Alternatively or additionally, the user may paste or enter content into the search box 320. Similarly, the authoring command to search for potential repeated content blocks for inclusion in the current document 120 may be sent automatically (i.e., when content is entered into the search box 320) or via a user command, such as, hitting a "search", "go", or "ok" button associated with the search box 320, or a return key.

In the example illustrated in FIG. 3A, the phrase "Preheat the oven" is shown in the search box 320, and several preview controls 260 related to the phrase have been returned by the trigger analyzer 140 as having been repeated in historic documents and of potential interest for inclusion in the current document 120 as based on the index 170. For example, each of the content blocks shown in the preview controls 260a-c may start with the phrase "preheat the oven" and are ranked for presentation by the trigger analyzer 140, by various schemes discussed above. As also discussed above, the user selects the preview controls 260 to preview or insert the associated content block into the current document 120.

As an alternative or in addition to a scroll bar, as discussed for the contextual menu 250, the illustrated pane 310 includes a more button 330, which will cause the trigger analyzer 140 to provide additional previews, if available. In some aspects, the additional previews will replace previous previews in the preview controls 260, while in other aspects, the additional previews are added to the pane 310, and the size of the preview control 260 previously present in the pane 310 may be reduced, or a scroll bar or navigation control may be added to the pane 310 to navigate the plurality of preview controls 260 presented to the user.

In FIG. 3B, illustrating second paned presentation 300b, the user has inserted the content block associated with the first preview control 260a from the initial paned presentation 300a into the current document 120, and has continued authoring the current document 120, entering the text "Separate the yolks and whites" in a new paragraph. As also illustrated, the search box 320 also contains the text "Separate the yolks and whites", and the pane 310 includes preview controls 260 for repeated content blocks, including textual content in first preview control 260a and second preview control 260b, and non-textual content in third preview control 260c.

In FIG. 3C, illustrating third paned presentation 300c, the insertion of each of the content blocks associated with the three preview controls 260a-c illustrated in second paned presentation 300b is shown. As is shown, the panel 310 remains open after inserting content blocks into the current document 120, but in some aspects, the panel 310 may be closed upon inserting a content block. In the third paned presentation 300c, the order of the preview controls 310 remains constant between pre- and post-insertion, but in other aspects, preview controls 260 that are selected for insertion are removed from the panel 310 or are demoted in order in the panel 310. By leaving the pane open after a block of content has been inserted into the current document 120, the user may select multiple blocks of content to insert into the current document 120 and control the order in which to insert those blocks.

Figure 4A:
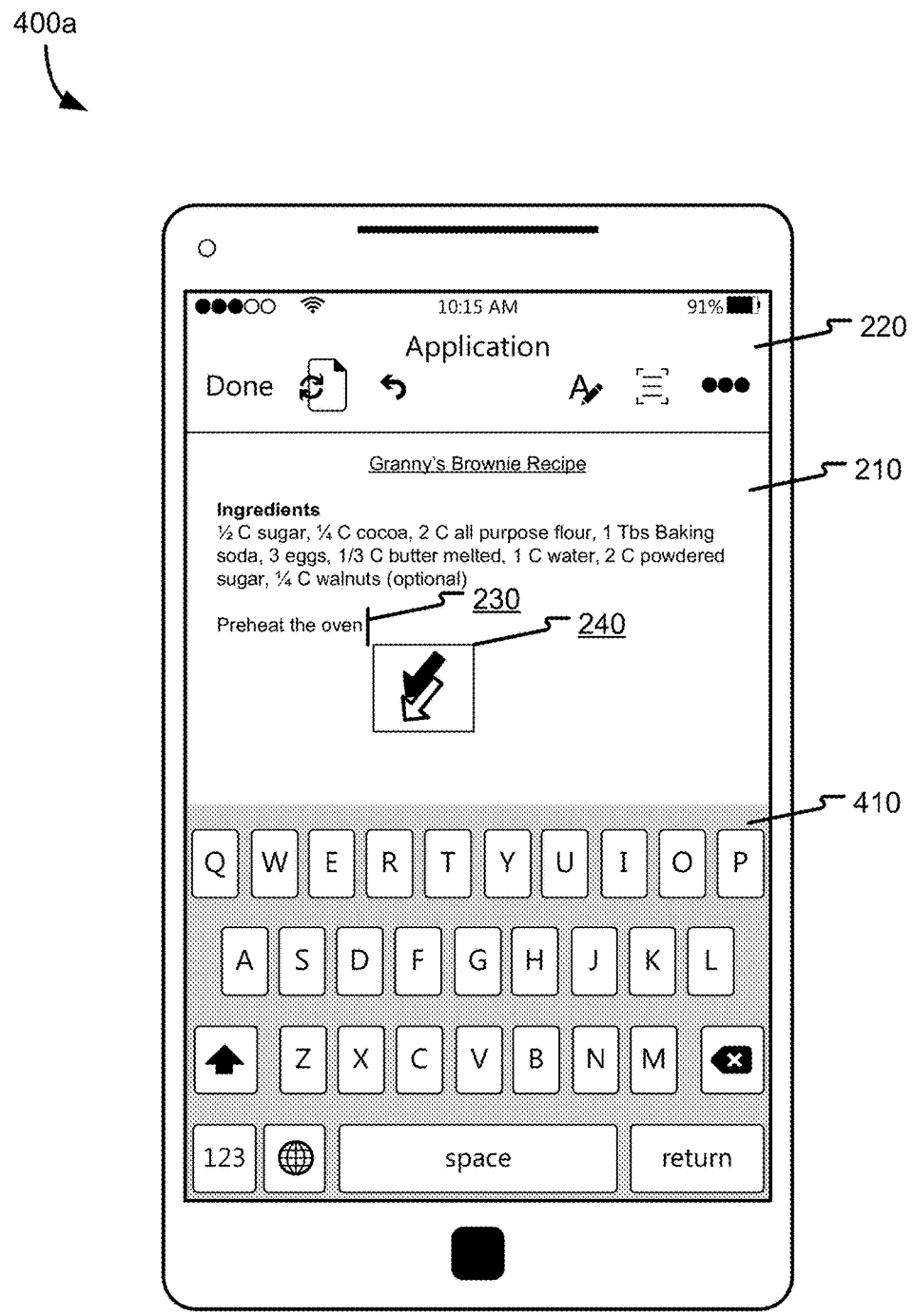
FIGS. 4A-C are example user interfaces of mobile presentations.
Figure 4B:
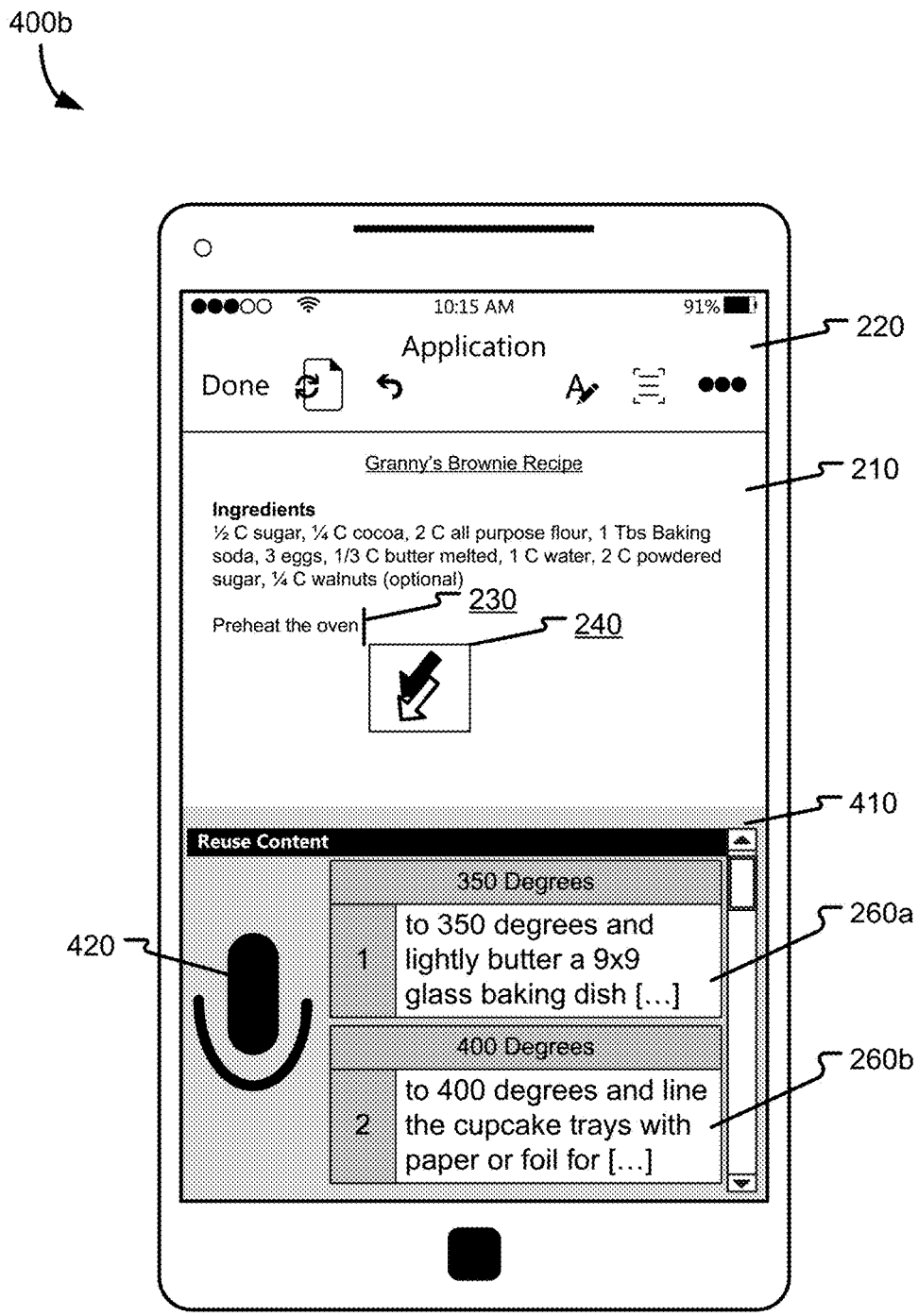
Figure 4C:
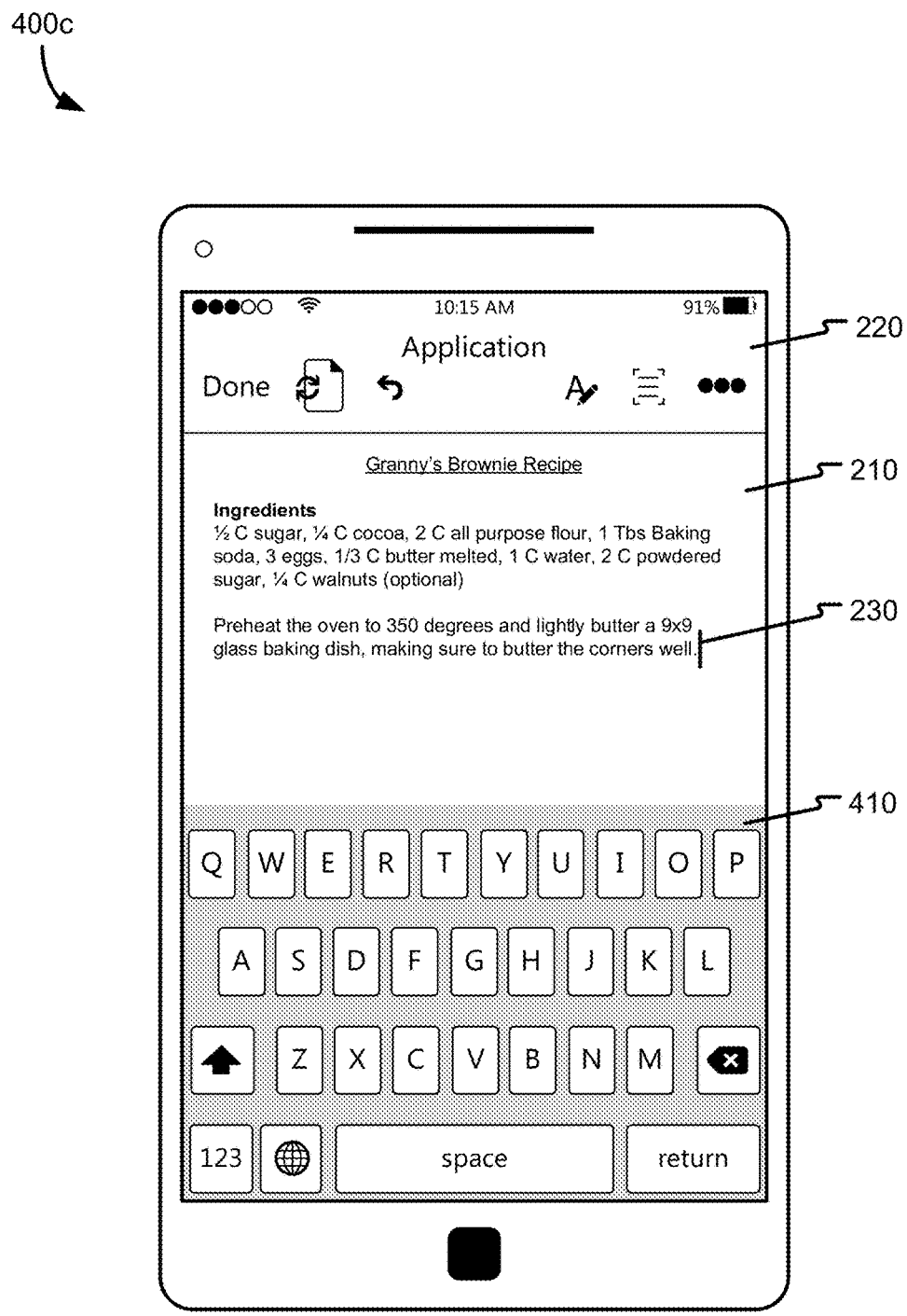

FIGS. 4A-C are examples of UI for mobile presentations 400a-c. Each of the mobile presentations 400a-c (generally, mobile presentations 400) illustrate, in sequence, the UI as the user authors the current document 120 and is automatically presented with, and chooses to use, content blocks of repeated content. In the FIGS. 4A-C, the user is using a mobile implementation (e.g., on a smartphone, tablet, or other small form-factor device) of a word processing application, although other applications may also make use of the present disclosure, such as, for example, spreadsheet applications, slide presentation application, email applications, note-taking applications, and the like.

In FIG. 4A, an initial mobile presentation 400a is illustrated. The user has begun authoring a document related to a recipe using an authoring panel 410 which includes authoring controls, such as, for example, a soft-keyboard generated for a touchscreen or a series of related command controls. The trigger analyzer 140 has recognized the phrase "Preheat the oven" as a trigger, and has notified the application that a block of repeated content exists that matches the trigger, which is indicated to the user in the GUI via a notification icon 240.

When the user chooses to acknowledge the notification icon 240, for example, by using a touch screen, voice command, or external pointing device to select the notification icon 240, a second mobile presentation 400b, such as that illustrated in FIG. 4B will replace the initial mobile presentation 400a. In FIG. 4B, the content of the authoring panel 410 is replaced with preview controls 260, for the user to select a content block for insertion into the current document 120, and a playback control 420, for the user to toggle whether a playback of the content block represented by a preview control 260 is desired, for example, via text-to-speech audio playback, ghosted text, opening non-textual content in a new window, etc.

When the user selects a preview control 260 from the authoring panel 410, for example, by using a touch screen, voice command, or external pointing device, a third mobile presentation 400c, such as that illustrated in FIG. 4C will replace the second mobile presentation 400b. In FIG. 4C, the content block associated with a selected preview control 260 is inserted into the current document 120, the text cursor 230 is automatically moved to the end of the content block, the previous state of the authoring panel 410 is reverted to, and the notification icon 240 is removed from the document display 210.

When the user selects a dismissal control (not illustrated), or reselects the document display 210 when viewing the second mobile presentation 300b, the initial mobile presentation 400a may replace the second mobile presentation 400b.

Figure 5:
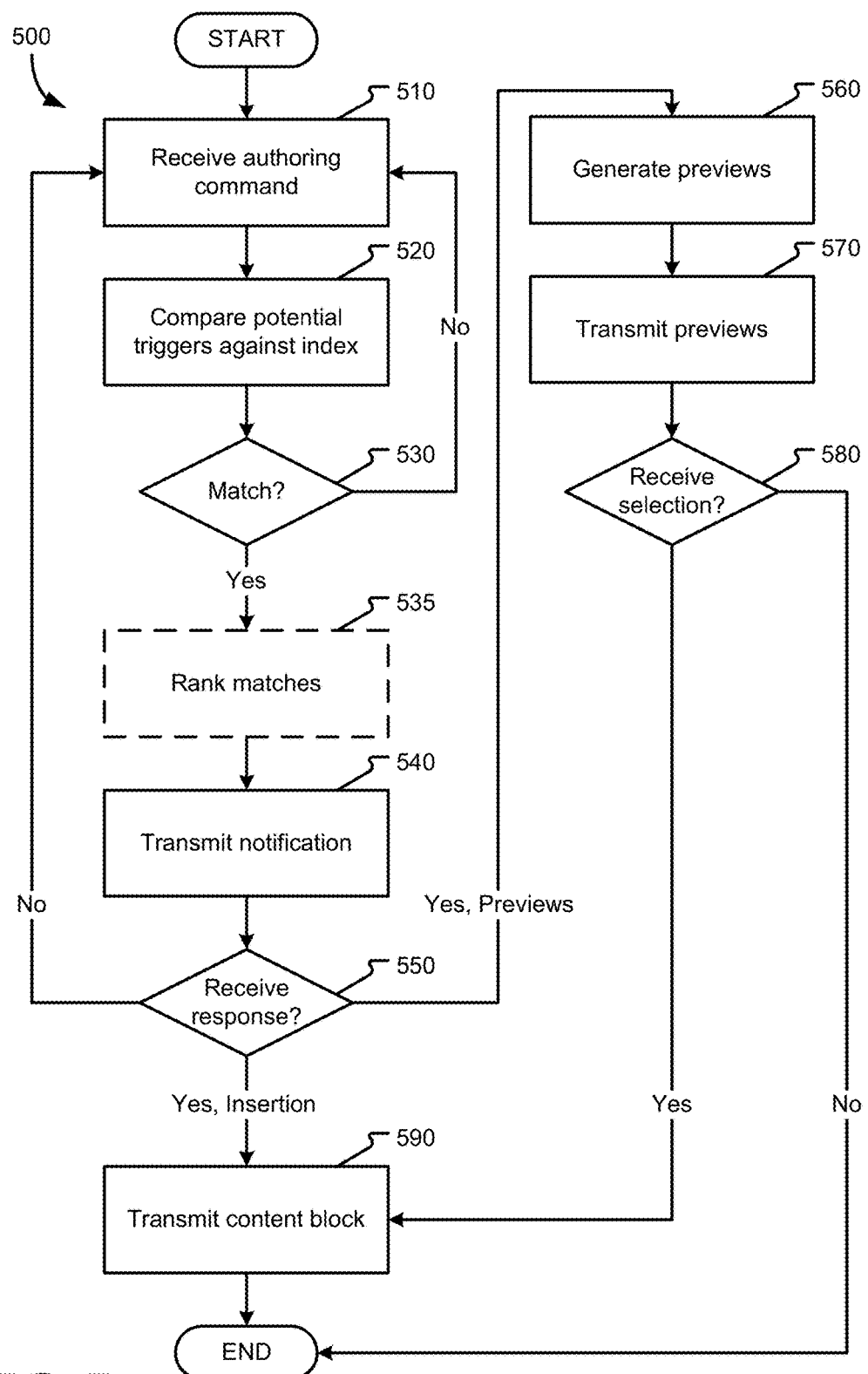
FIG. 5 is a flow chart showing general stages involved in an example method for a server to provide automated repeated content presentation.

FIG. 5 is a flow chart showing general stages involved in an example METHOD 500 for a server to provide automated repeated content presentation. METHOD 500 begins at OPERATION 510, where an authoring command is received by the trigger analyzer 140. In various aspects, an authoring command includes insertions of content, deletions of content, repositioning a text cursor 230, or transmitting a query. An authoring command indicates to the trigger analyzer 140 that the content of the current document 120 has changed or that the user is potentially planning to change the content of the current document 120.

The new state of the current document 120 after the authoring command is received is used by the trigger analyzer 140 at OPERATION 520 to compare potential triggers against an index 170 linking triggers and blocks of repeated content from historic documents. In various aspects, the trigger analyzer 140 uses a register of recently received authoring commands (e.g., typed characters) to compare to the index 170. In other aspects, the trigger analyzer 140 looks up content in the current document 120 backwards from a position of a text cursor 230 in the content of the current document 120 to compare to the index 170. In yet other aspects, a query is sent to the trigger analyzer 140 to compare to the index 170 to return blocks of repeated content related to the query.

METHOD 500 then proceeds to DECISION 530 where it is determined if a match exists between the potential triggers from the current document 120 and the triggers in the index 170. If no triggers from the index 170 are determined to match the potential triggers from the current document 120, the user can continue to author the current document 120 without intervention of the trigger analyzer 140, and METHOD 500 returns to OPERATION 510. If more than one potential match is found at DECISION 530, METHOD 500 proceeds to OPTIONAL OPERATION 535, otherwise METHOD 500 proceeds to OPERATION 540.

At OPTIONAL OPERATION 535, the more than one match is ranked for presentation to the user. In some aspects, the trigger analyzer 140 ranks the results by an exactness of a content block's trigger to the contents of the current document 120, a recentness of use of the repeated content blocks having triggers matching the contents of the current document (e.g., most recent, most recent not appearing in the current document 120, least recent, most recently becoming considered a repeated content block), a frequency of use of the content blocks (e.g., most frequent, most frequent not appearing in the current document 120, least frequent), a user preference, and combinations thereof.

At OPERATION 540 the trigger analyzer 140 transmits a notification to the user that a block of repeated content that matches the content of the current document 120 is available for insertion into the current document 120. In some aspects, the user receives the notification via a notification icon 240 displayed within a document display 210 of an application for editing the current document 120, while in other aspects, the user receives the notification as preview controls 260, for example, displayed in a pane 310 of the application for editing the current document 120.

At DECISION 550 it is determined whether a response is received from the user. If no response is received, and the user continues to edit the current document 120, the notification may be persisted in the application or removed from the application, but METHOD 500 returns to OPERATION 510. If a response is received requesting the insertion of a content block, for example by the user selecting the notification icon 240 to insert the top-ranked block of repeated content or selecting the preview control 260 to insert the associated block of content, METHOD 500 proceeds to OPERATION 590. If a response is received requesting previews (or additional previews), for example by the user selecting a subcontrol of the notification icon 240 or a more button 330, METHOD 500 proceeds to OPERATION 560.

When METHOD 500 proceeds to OPERATION 560, the trigger analyzer 140 generates previews of the associated blocks of repeated content for display to the user. In various aspects, the previews are truncated, reduced in quality, or otherwise compressed to reduce the amount of data transmitted to the user and to fit the display capabilities (and preferences) of the application and preview controls 260. The compression of the blocks of content is done according to various rules and user preferences for how the preview content is to be displayed in a GUI, and the trigger analyzer 140 may pull portions or all of the blocks of content from the historic documents in which they are found, without having to open the historic documents with an authoring application, or from the index 170, when the index 170 includes the blocks of content or previews thereof.

At OPERATION 570, the previews generated in OPERATION 560 are transmitted to the user so that the user may select previews for insertion into the current document 120, for example, via associated preview controls 260.

Proceeding to DECISION 580, it is determined whether a selection of a preview has been received from the user, for example via a preview control 260. When it is determined that the user has selected a particular preview, METHOD 500 proceeds to OPERATION 590, where the block of repeated content associated with the particular preview will be transmitted for integration into the current document 120. Otherwise, METHOD 500 concludes.

At OPERATION 590 the content block is transmitted to the current document 120. In various aspects, the content block is transmitted to the computer device on which the current document 120 is stored, which may include the user device 110, a networked device, or a cloud device or cloud server. When no permanent copy of the current document 120 yet exists (e.g., the current document 120 is a read-only or unsaved copy existing in short-term or volatile memory of a computer device) the content block is transmitted to the computer device on which the application used to edit the current document 120 is running, which may be different from the computer device on which the current document 120 is eventually saved (if it is saved). In various aspects, the repeated block of content is extracted from a historic document, without needing an authoring application to open the historic document, while in other aspects the repeated block of content is extracted from the index 170. After the block of repeated content is transmitted to the current document 120, METHOD 500 then concludes.

Figure 6:
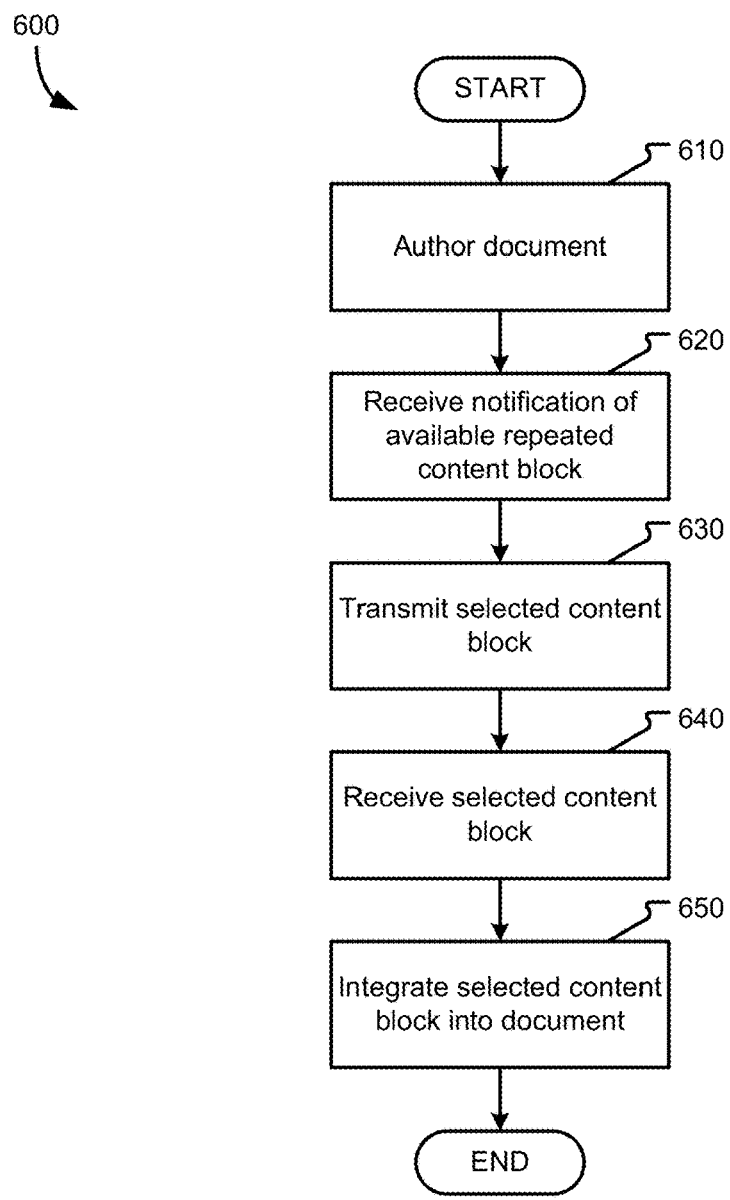
FIG. 6 is a flow chart showing general stages involved in an example method for a user to participate in automated repeated content presentation.

FIG. 6 is a flow chart showing general stages involved in an example METHOD 600 for a user to participate in automated repeated content presentation. METHOD 600 begins at OPERATION 610, where a user authors a current document 120. The user may create a new document (blank or via a template) or open a historic document for use as the current document 120 to author.

As the user authors the current document 120, for example, by typing, inserting content, deleting content, running macros, formatting content, etc., METHOD 600 will proceed to OPERATION 620, where the user receives a notification that an available block of repeated content has been determined by the trigger analyzer 140 to be relevant to the present state of the current document 120. For example, the user may have entered content that matches a trigger held by the index 170, the user may have moved a text cursor 230 to a position within the current document 120 that includes content that matches a trigger held by the index 170, or the user may have transmitted a query for blocks of repeated content associated with a trigger in the index 170 that matches content in a search box 320.

METHOD 600 then proceeds to OPERATION 630, where the user selects a content block to insert into the current document 120, for example, via a notification icon 240 or a preview control 260. When a selection is made, that selection is transmitted to the trigger analyzer 140, for example, as an identifier of a position of the selected content block in a ranked list of content blocks presented to the user. The trigger analyzer 140 will transmit the block of repeated content to the current document 120 that was selected, which is received in OPERATION 640 by the current document 120.

At OPERATION 650 the selected block of repeated content is integrated into the current document 120. In various aspects, the application by which the current document 120 is being authored will integrate the selected block via a merge operation (e.g., mail merge), via a paste operation (e.g., adding the block temporarily to a clipboard), or via a direct feed of input commands to the current document 120. In various aspects, the style or format of the selected block of repeated content may be that of the source historic document or the destination current document 120. METHOD 600 then concludes.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
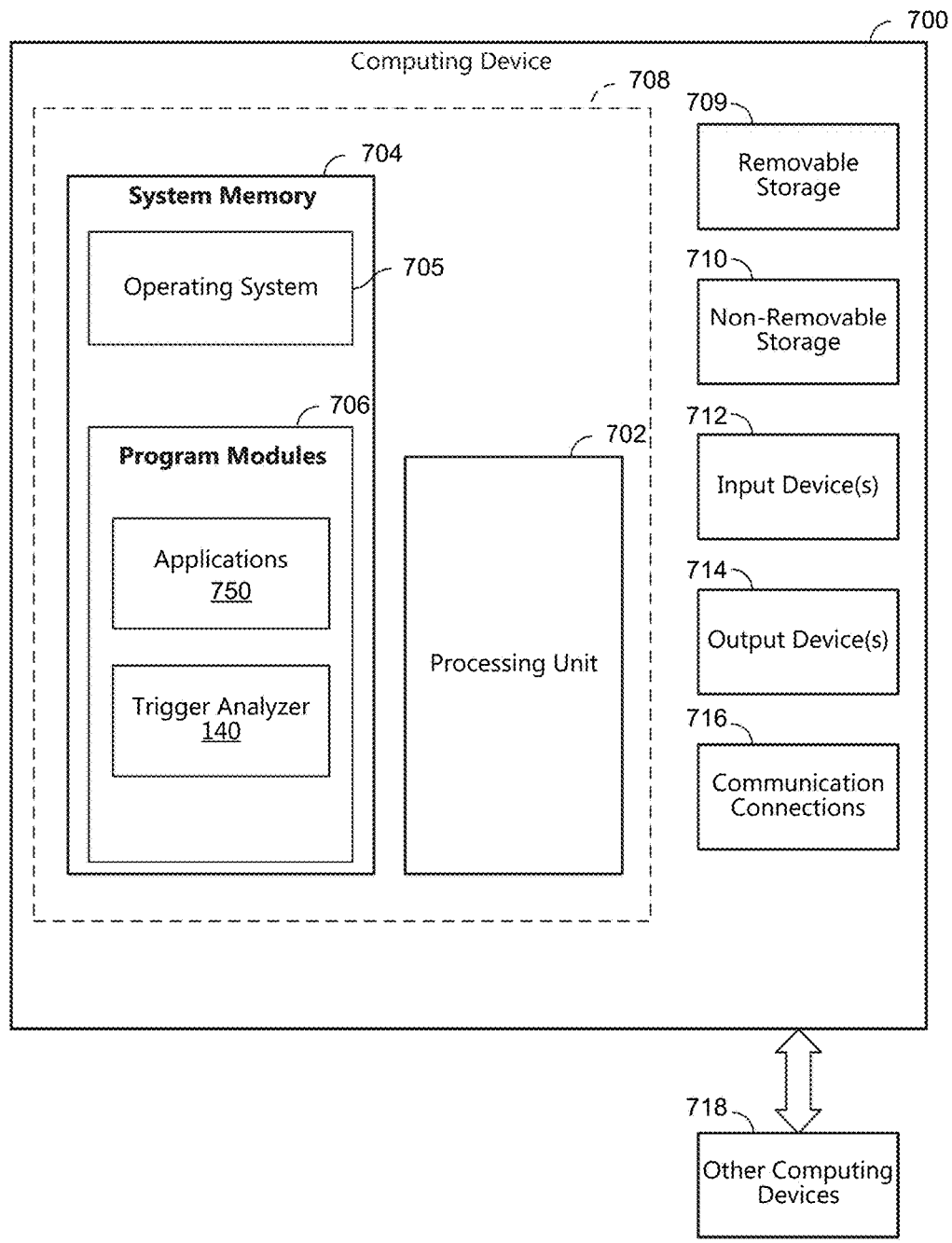
FIG. 7 is a block diagram illustrating example physical components of a computing device.
Figure 8A:
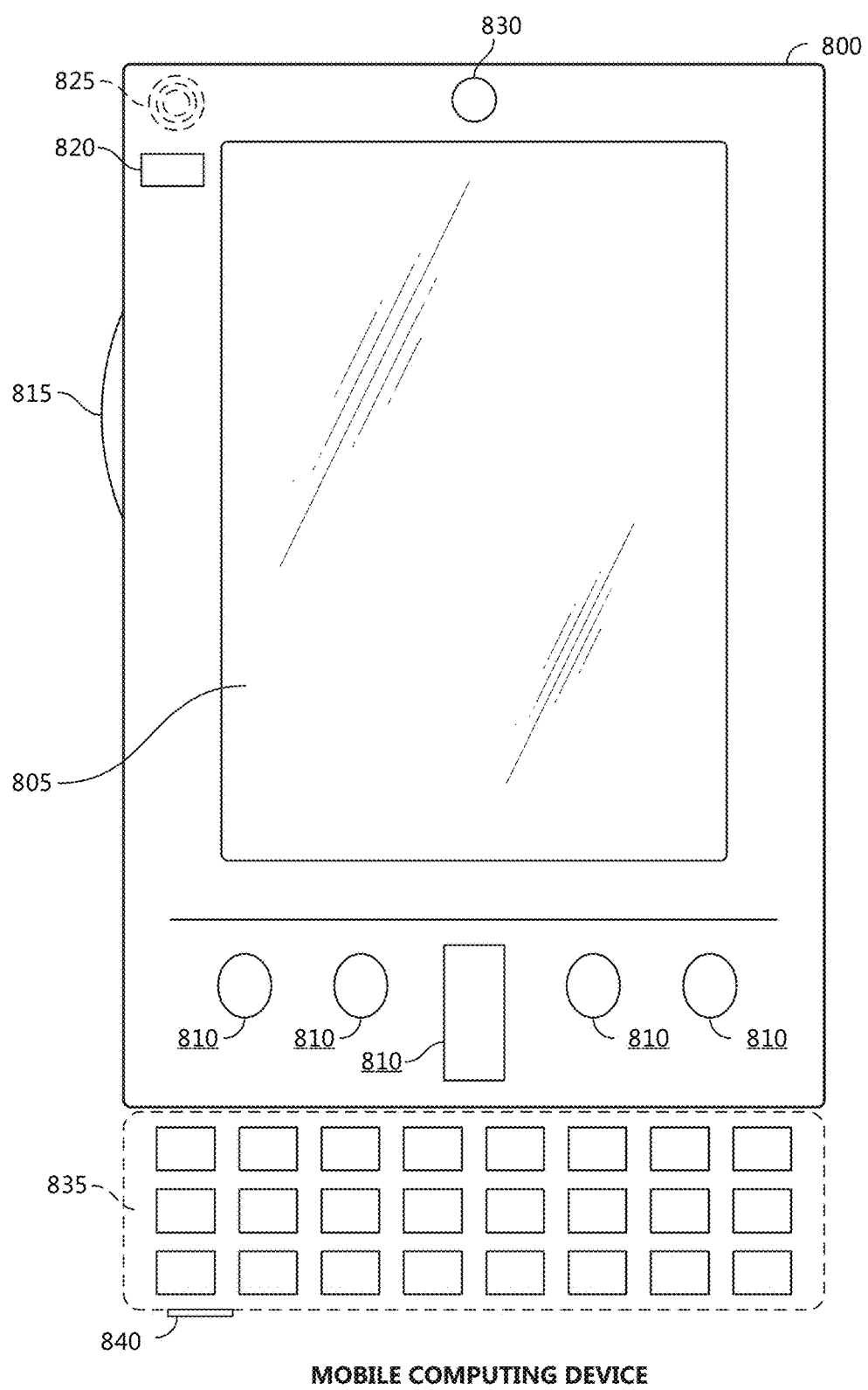
FIGS. 8A and 8B are block diagrams of a mobile computing device.
Figure 8B:
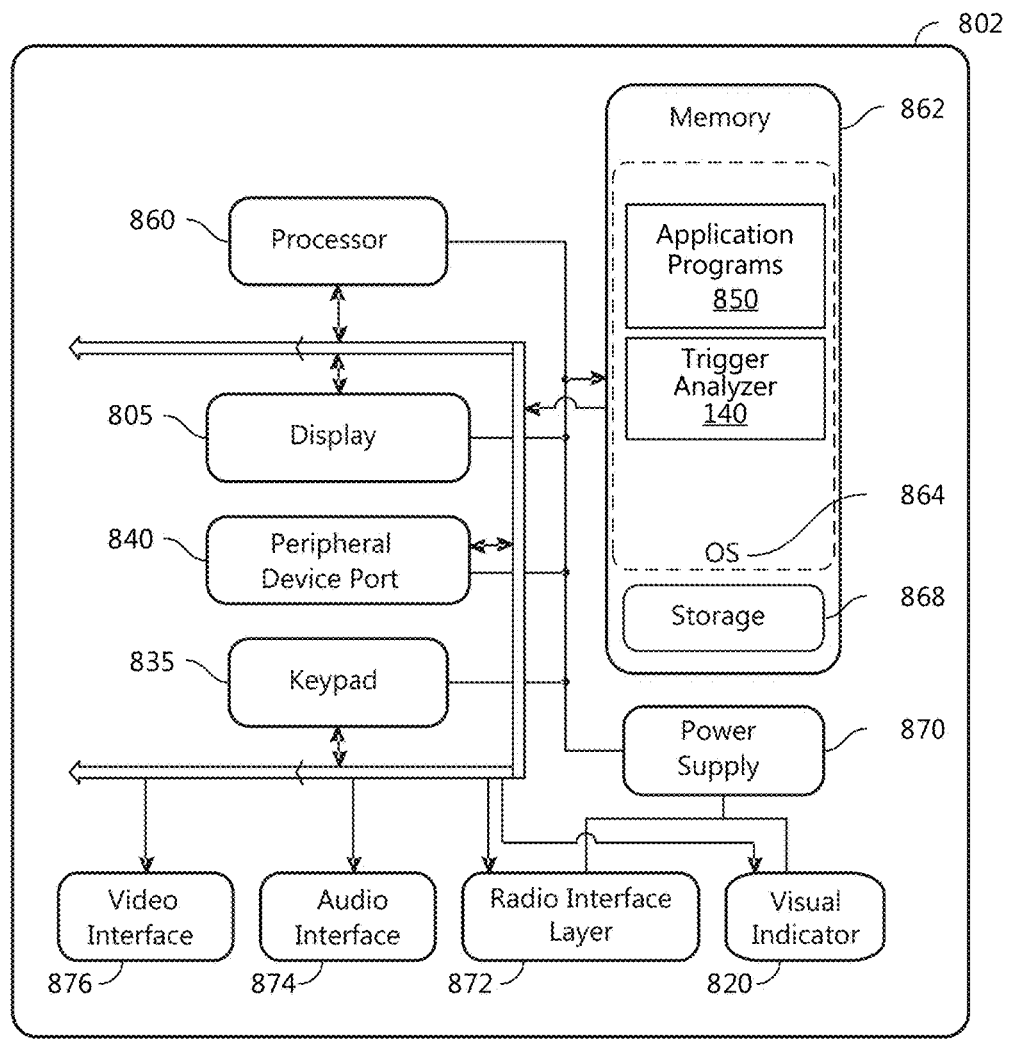
Figure 9:
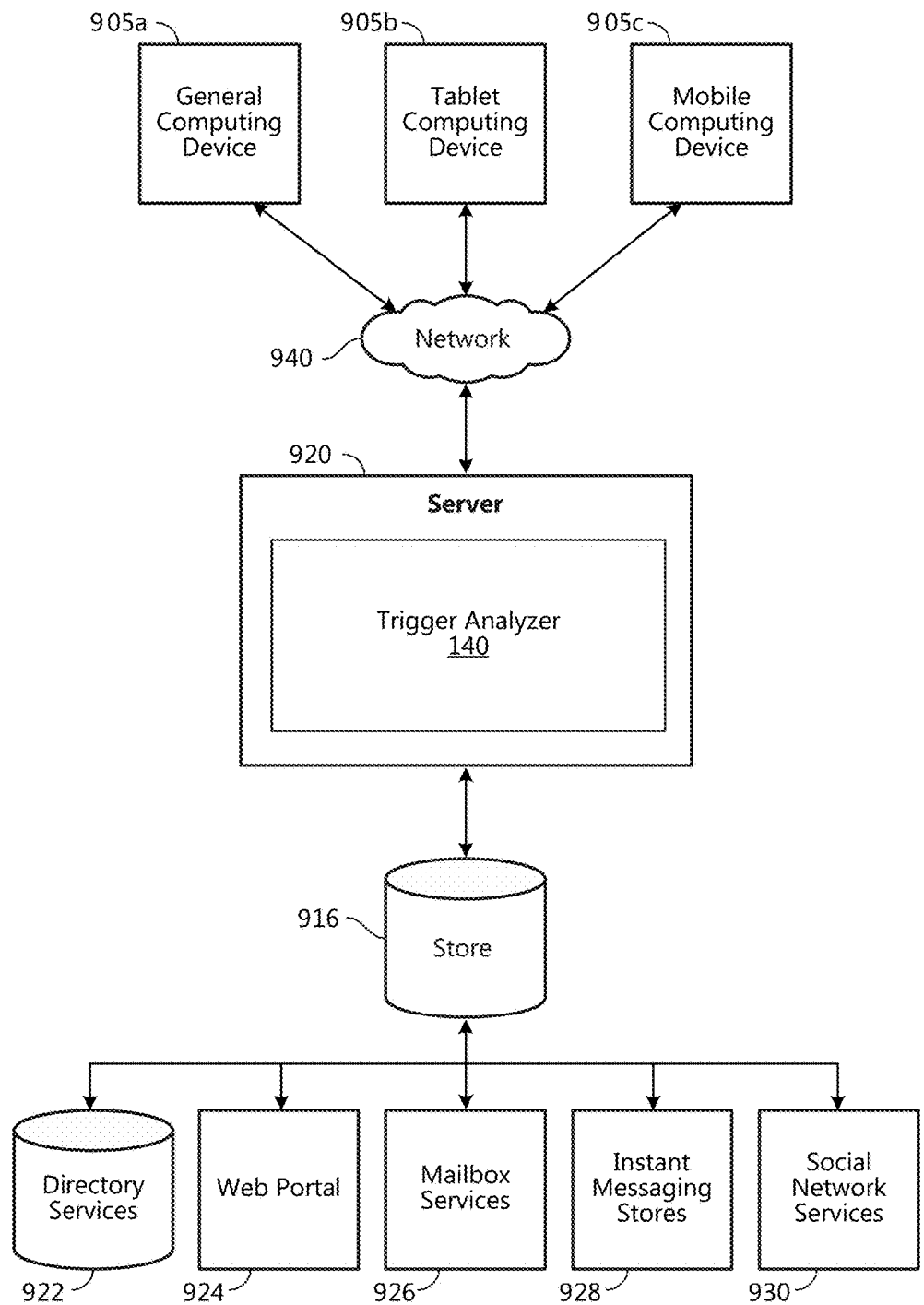
FIG. 9 is a block diagram of a distributed computing system.

FIGS. 7-9 and the associated descriptions provide a discussion of a variety of operating environments in which examples are practiced. However, the devices and systems illustrated and discussed with respect to FIGS. 7-9 are for purposes of example and illustration and are not limiting of a vast number of computing device configurations that are utilized for practicing aspects, described herein.

FIG. 7 is a block diagram illustrating physical components (i.e., hardware) of a computing device 700 with which examples of the present disclosure may be practiced. In a basic configuration, the computing device 700 includes at least one processing unit 702 and a system memory 704. According to an aspect, depending on the configuration and type of computing device, the system memory 704 comprises, but is not limited to, volatile storage (e.g., random access memory), non-volatile storage (e.g., read-only memory), flash memory, or any combination of such memories. According to an aspect, the system memory 704 includes an operating system 705 and one or more program modules 706 suitable for running software applications 750. According to an aspect, the system memory 704 includes trigger analyzer 140. The operating system 705, for example, is suitable for controlling the operation of the computing device 700. Furthermore, aspects are practiced in conjunction with a graphics library, other operating systems, or any other application program, and is not limited to any particular application or system. This basic configuration is illustrated in FIG. 7 by those components within a dashed line 708. According to an aspect, the computing device 700 has additional features or functionality. For example, according to an aspect, the computing device 700 includes additional data storage devices (removable and/or non-removable) such as, for example, magnetic disks, optical disks, or tape. Such additional storage is illustrated in FIG. 7 by a removable storage device 709 and a non-removable storage device 710.

As stated above, according to an aspect, a number of program modules and data files are stored in the system memory 704. While executing on the processing unit 702, the program modules 706 (e.g., trigger analyzer 140) perform processes including, but not limited to, one or more of the stages of the METHODS 500 and 600 illustrated in FIGS. 5 and 6, respectively. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 7 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 700 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 700 has one or more input device(s) 712 such as a keyboard, a mouse, a pen, a sound input device, a touch input device, etc. The output device(s) 714 such as a display, speakers, a printer, etc. are also included according to an aspect. The aforementioned devices are examples and others may be used. According to an aspect, the computing device 700 includes one or more communication connections 716 allowing communications with other computing devices 718. Examples of suitable communication connections 716 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. According to an aspect, any such computer storage media is part of the computing device 700. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 8A and 8B illustrate a mobile computing device 800, for example, a mobile telephone, a smart phone, a tablet personal computer, a laptop computer, and the like, with which aspects may be practiced. With reference to FIG. 8A, an example of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. According to an aspect, the display 805 of the mobile computing device 800 functions as an input device (e.g., a touch screen display). If included, an optional side input element 815 allows further user input. According to an aspect, the side input element 815 is a rotary switch, a button, or any other type of manual input element. In alternative examples, mobile computing device 800 incorporates more or fewer input elements. For example, the display 805 may not be a touch screen in some examples. In alternative examples, the mobile computing device 800 is a portable phone system, such as a cellular phone. According to an aspect, the mobile computing device 800 includes an optional keypad 835. According to an aspect, the optional keypad 835 is a physical keypad. According to another aspect, the optional keypad 835 is a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some examples, the mobile computing device 800 incorporates a vibration transducer for providing the user with tactile feedback. In yet another example, the mobile computing device 800 incorporates a peripheral device port 840, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one example of a mobile computing device. That is, the mobile computing device 800 incorporates a system (i.e., an architecture) 802 to implement some examples. In one example, the system 802 is implemented as a "smart phone" capable of running one or more applications (e.g., browser, e-mail, calendaring, contact managers, messaging clients, games, and media clients/players). In some examples, the system 802 is integrated as a computing device, such as an integrated personal digital assistant (PDA) and wireless phone.

According to an aspect, one or more application programs 850 are loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. According to an aspect, trigger analyzer 140 is loaded into memory 862. The system 802 also includes a non-volatile storage area 868 within the memory 862. The non-volatile storage area 868 is used to store persistent information that should not be lost if the system 802 is powered down. The application programs 850 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800.

According to an aspect, the system 802 has a power supply 870, which is implemented as one or more batteries. According to an aspect, the power supply 870 further includes an external power source, such as an AC adapter or a powered docking cradle that supplements or recharges the batteries.

According to an aspect, the system 802 includes a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 850 via the operating system 864, and vice versa.

According to an aspect, the visual indicator 820 is used to provide visual notifications and/or an audio interface 874 is used for producing audible notifications via the audio transducer 825. In the illustrated example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. According to an aspect, the system 802 further includes a video interface 876 that enables an operation of an on-board camera 830 to record still images, video stream, and the like.

According to an aspect, a mobile computing device 800 implementing the system 802 has additional features or functionality. For example, the mobile computing device 800 includes additional data storage devices (removable and/or non-removable) such as, magnetic disks, optical disks, or tape. Such additional storage is illustrated in FIG. 8B by the non-volatile storage area 868.

According to an aspect, data/information generated or captured by the mobile computing device 800 and stored via the system 802 are stored locally on the mobile computing device 800, as described above. According to another aspect, the data are stored on any number of storage media that are accessible by the device via the radio 872 or via a wired connection between the mobile computing device 800 and a separate computing device associated with the mobile computing device 800, for example, a server computer in a distributed computing network, such as the Internet. As should be appreciated, such data/information are accessible via the mobile computing device 800 via the radio 872 or via a distributed computing network. Similarly, according to an aspect, such data/information are readily transferred between computing devices for storage and use according to well-known data/information transfer and storage means, including electronic mail and collaborative data/information sharing systems.

FIG. 9 illustrates one example of the architecture of a system for automatic presentation of blocks of repeated content as described above. Content developed, interacted with, or edited in association with the trigger analyzer 140 is enabled to be stored in different communication channels or other storage types. For example, various documents may be stored using a directory service 922, a web portal 924, a mailbox service 926, an instant messaging store 928, or a social networking site 930. The trigger analyzer 140 is operative to use any of these types of systems or the like for the automated presentation of blocks of repeated content from historic documents in a current document 120, as described herein. According to an aspect, a server 920 provides the trigger analyzer 140 to clients 905*a,b,c*. As one example, the server 920 is a web server providing the trigger analyzer 140 over the web. The server 920 provides the trigger analyzer 140 over the web to clients 905 through a network 940. By way of example, the client computing device is implemented and embodied in a personal computer 905*a*, a tablet computing device 905*b* or a mobile computing device 905*c* (e.g., a smart phone), or other computing device. Any of these examples of the client computing device are operable to obtain content from the store 916.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A method for improving efficiency in a computer device used for authoring a current document, comprising:
   receiving, by a server, an authoring command from the current document;
   in response to receiving the authoring command, comparing, by the server, contents of the current document against an index, wherein the index includes triggers correlated to repeated content blocks found in a minimum number of historic documents, wherein the minimum number is a user-defined value, wherein a content of the repeated content blocks has a minimum size based on a number of words or characters in the content and wherein the minimum size is a user-defined value;
   when it is determined that the authoring command matches at least one trigger from the index, transmitting, from the server, a notification to the computer device that the at least one repeated content block is available for insertion into the current document; and
   when a response is received from the computer device indicating a selection of a given repeated content block from the at least one repeated content block, transmitting the given repeated content block to the current document for insertion into the current document.

2. The method of claim 1, wherein the historic documents are identified from a user specified location.

3. The method of claim 1, wherein the repeated content blocks are one or more of:
   sentences;
   paragraphs;
   pages;
   slides;
   images;
   charts;
   graphs;
   tables;
   videos; and
   audio files.

4. The method of claim 1, wherein the triggers comprise content preceding the repeated content blocks in the historic documents.

5. The method of claim 1, wherein the at least one repeated content block is found in a user defined number of the historic documents.

6. The method of claim 1, wherein the authoring command comprises textual content entry of a user defined number of the last characters entered into the current document.

7. The method of claim 6, wherein the authoring command comprises a user defined amount of content selected backward in the current document from a text cursor location in the current document in response to a user relocating the text cursor in the current document.

8. The method of claim 1, wherein the authoring command comprises a query received from a pane in an authoring application used to author the current document.

9. The method of claim 1, wherein when the at least one repeated content block includes more than one repeated content block, and wherein the repeated content blocks are ordered in the notification according to a user preference, the user preference comprising:
   an exactness of a match of the trigger to the repeated content blocks;
   a frequency of the repeated content blocks in the historic documents; or
   a recentness of the historic documents in which the repeated content blocks included.

10. The method of claim 1, wherein the notification includes a preview of the at least one repeated content block.

11. A system for improving efficiency in a computer device used for authoring a current document, comprising:
    a memory comprising a non-transitory storage medium; and
    a processor that executes instructions stored in the memory, wherein the instructions cause the processor to;
    store a minimum number of historic documents, wherein the minimum number is a user-defined value;
    store a plurality of triggers, wherein each trigger of the plurality of triggers is associated with a repeated content block, wherein each repeated content block is included in at least two of the plurality of historic documents, wherein a content of the repeated content block has a minimum size based on a number of words or characters in the content and wherein the minimum size is a user-defined value; and
    analyze content from the current document to determine which given triggers of the plurality of stored triggers match a content from the current document;
    generate previews of the repeated content blocks associated with the given triggers for the user to select from in the current document; and
    in response to receiving a selection of a particular preview from the user, return the repeated content block associated the particular preview to the current document for insertion in the current document.

12. The system of claim 11, wherein when the content from the current document is associated with multiple of the given triggers, generating the previews further comprises ordering the previews based on at least one of:
    an exactness of the given trigger to the associated repeated content block;
    a frequency of the associated repeated content block in the historic documents; or
    a recentness of the historic documents in which the associated repeated content block is included.

13. The system of claim 11, wherein the trigger includes textual content and the associated repeated content block includes non-textual content.

14. The system of claim 11, wherein the previews of the repeated content blocks are reduced size versions of the repeated content blocks, wherein reducing a size of the repeated content blocks comprises one of:
    reducing an amount of textual content;
    lowering a bits per second rate of video content;
    increasing a compression of image content; or
    cropping image content.

15. The system of claim 11, wherein the previews apply a format from the current document to the repeated content blocks to replace formats from the historic documents.

16. The system of claim 11, wherein the content analyzed from the current document is selected from the group consisting of:

a user defined amount of the content most recently entered into the current document;

a user defined amount of content located in the current document backwards in the current document from a text cursor location; or a user initiated query.

17. A method for improving efficiency in a computer device used for authoring a current document, comprising:

performing, at the computer device, an authoring command in the current document, wherein the computer device is in communication with a trigger analyzer;

receiving, at the computer device from the trigger analyzer, a plurality of suggested blocks of repeated content, wherein the suggested blocks of repeated content comprising the plurality of suggested blocks of repeated content are identified from a minimum number of historic documents based on the authoring command, wherein the minimum number of historic documents is a user-defined value, wherein each of the plurality of suggested blocks of repeated content contain content that has a minimum size based on a number of words or characters in the content and wherein the minimum size is a user-defined value;

providing, at the computer device, a display of the plurality of suggested blocks of repeated content, wherein the display provides an actuable control and a preview for each of the suggested blocks of repeated content comprising the plurality of suggested blocks of repeated content;

selecting, at the computer device, one suggested block of repeated content from the display; and incorporating the one suggested block of repeated content into the current document.

18. The method of claim 17, wherein the current document is provided by a remote computing device accessed the computing device used for authoring the current document, wherein incorporating the one suggested block of repeated content into the current document comprises the computing device requesting the remote computing device to insert the one suggested block of repeated content into the current document.

19. The method of claim 17, wherein the suggested blocks of repeated content are present in at least a user defined number of the historic documents.

20. The method of claim 17, further comprising:

in response to the preview for a given suggested block of repeated content being moused over in the display, displaying the given suggested block of repeated content in a ghosted format in the current document without incorporating the given suggested block of repeated content into the current document.

21. The method of claim 1 wherein the content of the repeated content blocks has a maximum sized based on the number of words or characters in the content and wherein the maximum size is a user-defined value.

22. The method of claim 1, wherein each of the triggers has a minimum content size of words or characters, and wherein the minimum content size is a user-defined value.

23. The method of claim 22, wherein each of the triggers has a maximum content size of words or characters, and wherein the maximum content size is a user-defined value.

24. The method of claim 23, wherein the authoring command includes a plurality of words or characters that are stored in a register, wherein the content of the register is compared against the triggers, and wherein a size of the register is larger than the maximum content size of each of the triggers.

* * * * *